United States Patent
Dunlap et al.

(10) Patent No.: US 7,229,586 B2
(45) Date of Patent: Jun. 12, 2007

(54) PROCESS FOR TEMPERING RAPID PROTOTYPE PARTS

(76) Inventors: Earl N. Dunlap, 10816 Preston Dr., Indianapolis, IN (US) 46236; Dennis M. Turner, 11350 N. Mann Rd., Mooresville, IN (US) 46158; Jack L. Lawson, 8531 Shelbyville Rd., Indianapolis, IN (US) 46259

( * ) Notice: Subject to any disclaimer, the term of this patent is extended or adjusted under 35 U.S.C. 154(b) by 272 days.

(21) Appl. No.: 10/431,154

(22) Filed: May 7, 2003

(65) Prior Publication Data

US 2003/0186042 A1    Oct. 2, 2003

Related U.S. Application Data

(60) Provisional application No. 60/378,518, filed on May 7, 2002.

(51) Int. Cl.
*B29C 35/08*  (2006.01)
*B29C 41/02*  (2006.01)
*B29C 41/20*  (2006.01)

(52) U.S. Cl. ............ 264/401; 264/129; 264/154; 264/308; 264/497

(58) Field of Classification Search ........... 264/129, 264/154, 308, 401, 497
See application file for complete search history.

(56) References Cited

U.S. PATENT DOCUMENTS

| | | | |
|---|---|---|---|
| 5,234,636 A | 8/1993 | Hull et al. | |
| 5,296,335 A | 3/1994 | Thomas et al. | |
| 5,415,820 A | 5/1995 | Furuta et al. | |
| 5,482,659 A * | 1/1996 | Sauerhoefer | ............ 264/401 |
| 5,616,293 A | 4/1997 | Ashtiani-Zarandi | |
| 5,651,934 A | 7/1997 | Almquist et al. | |
| 5,658,334 A * | 8/1997 | Caldarise et al. | ............ 128/898 |
| 5,688,464 A | 11/1997 | Jacobs et al. | |
| 5,693,144 A | 12/1997 | Jacobs et al. | |
| 5,707,578 A | 1/1998 | Johnson et al. | |
| 5,728,345 A | 3/1998 | Hlavaty et al. | |
| 5,731,042 A | 3/1998 | Glende et al. | |
| 5,824,260 A * | 10/1998 | Sauerhoefer | ............ 264/401 |
| 5,855,718 A | 1/1999 | Nguyen et al. | |
| 5,855,836 A | 1/1999 | Leyden et al. | |
| 5,891,382 A | 4/1999 | Almquist et al. | |
| 5,901,593 A | 5/1999 | Fritz | |
| 5,902,538 A | 5/1999 | Kruger et al. | |
| 5,943,235 A | 8/1999 | Earl et al. | |

(Continued)

OTHER PUBLICATIONS

*Objet Quadra*™, 3D Rapid Prototyping Inkjet System, two pages, 2001.

(Continued)

*Primary Examiner*—Leo B. Tentoni
(74) *Attorney, Agent, or Firm*—Barnes & Thornburg LLP

(57) ABSTRACT

A rapid prototype tempering process comprises producing a rapid prototype part from a base material, creating voids in the rapid prototype part, and filling the voids with a filler material that changes at least one characteristic of the prototype part. The rapid prototype part may be made, for example, by stereolithography, selective laser sintering (SLS), extrusion, printhead technology, or the like. The base material is generally a brittle material and the filler material may be selected to enhance the durability of the prototype part, for example. Parts made completely from a filler material that is injected into cavities of molds made from a base material are also disclosed.

56 Claims, 14 Drawing Sheets

U.S. PATENT DOCUMENTS

| | | |
|---|---|---|
| 5,945,058 A | 8/1999 | Manners et al. |
| 5,965,079 A | 10/1999 | Manners |
| 5,989,476 A | 11/1999 | Lockard et al. |
| 5,999,184 A | 12/1999 | Smalley et al. |
| 6,002,695 A | 12/1999 | Alfrey et al. |
| 6,029,096 A | 2/2000 | Manners et al. |
| 6,047,580 A | 4/2000 | Fritz |
| 6,048,487 A | 4/2000 | Almquist et al. |
| 6,084,980 A | 7/2000 | Nguyen et al. |
| 6,309,581 B1 | 10/2001 | Gervasi |
| 6,372,173 B1 | 4/2002 | Peschges |
| 6,556,754 B2 * | 4/2003 | Simmons et al. ........... 385/121 |
| 6,785,123 B2 * | 8/2004 | Keser .......................... 361/509 |
| 6,800,324 B2 * | 10/2004 | Chong et al. ................ 427/261 |

OTHER PUBLICATIONS

*Objet QuadraTempo*™, 3d Rapid Prototyping Inkjet System, two pages, 2001.

* cited by examiner

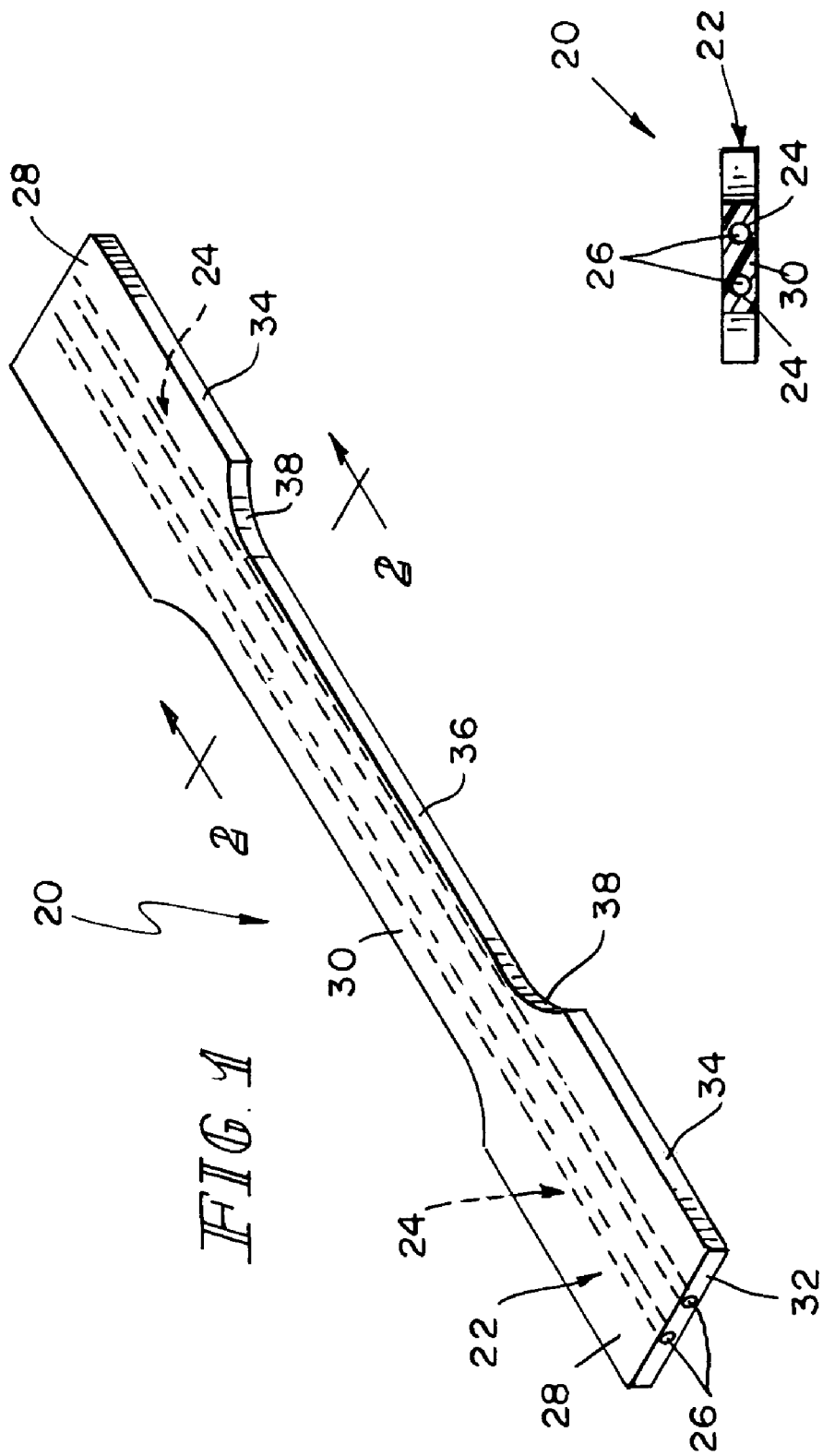

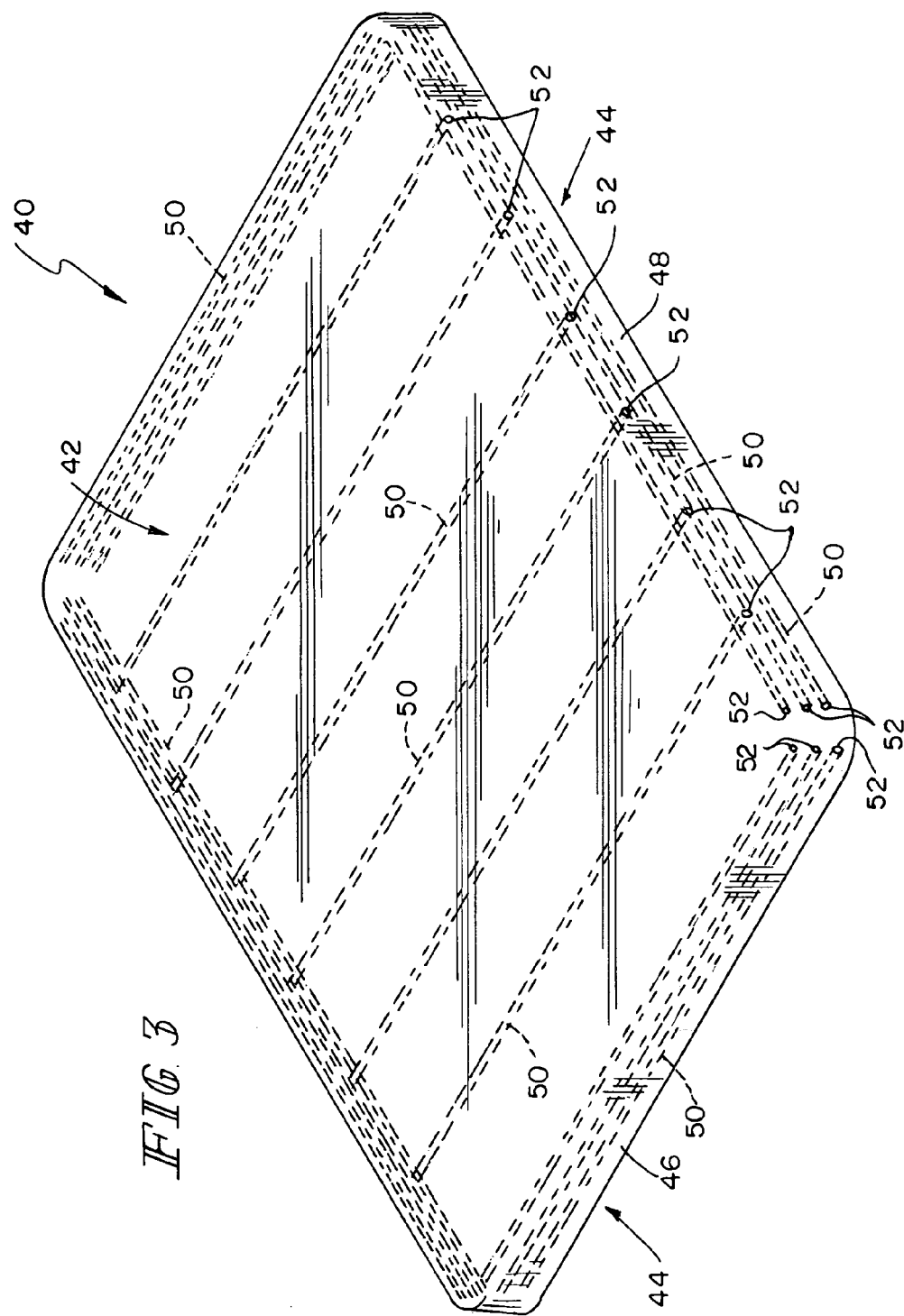

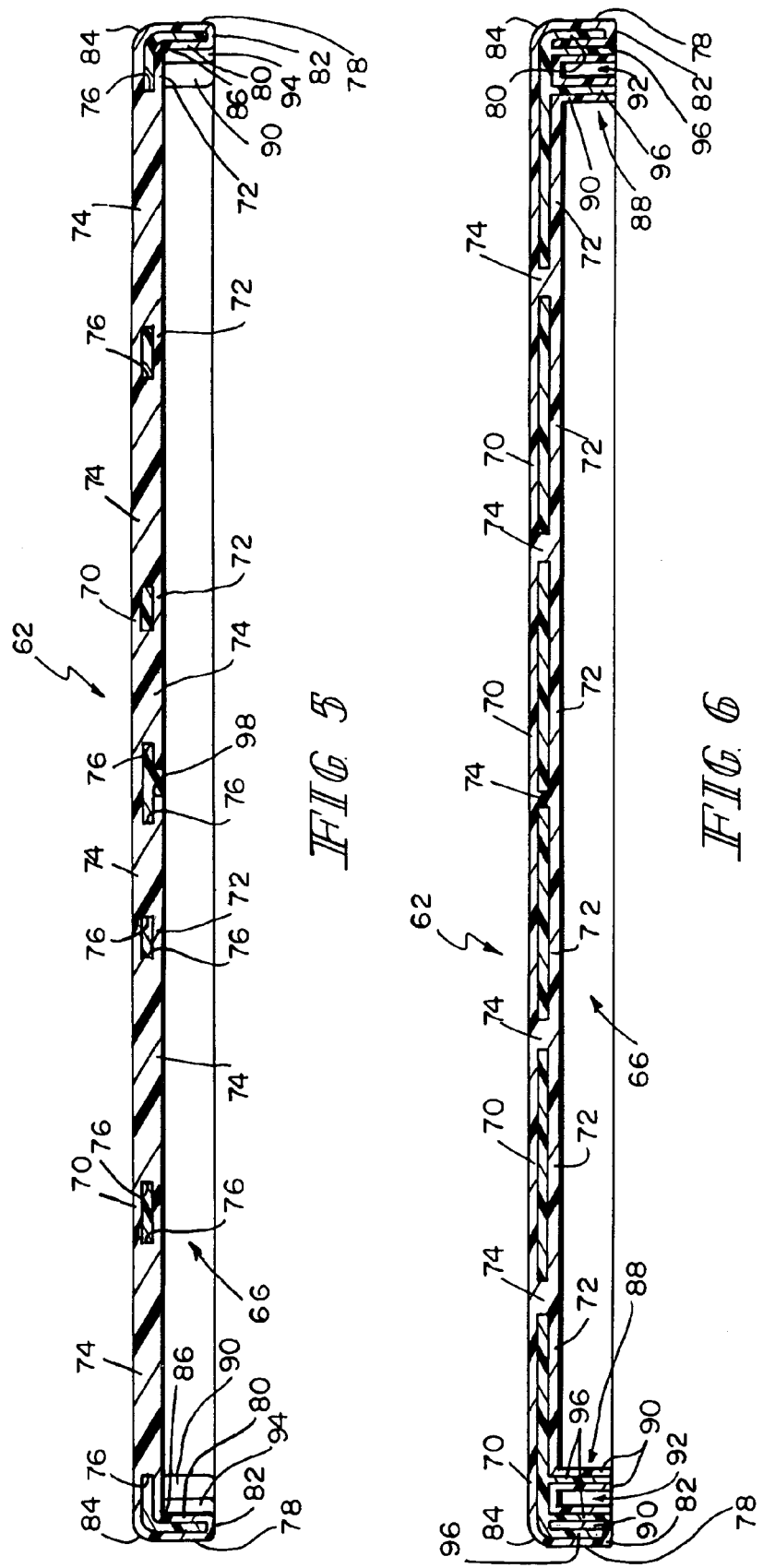

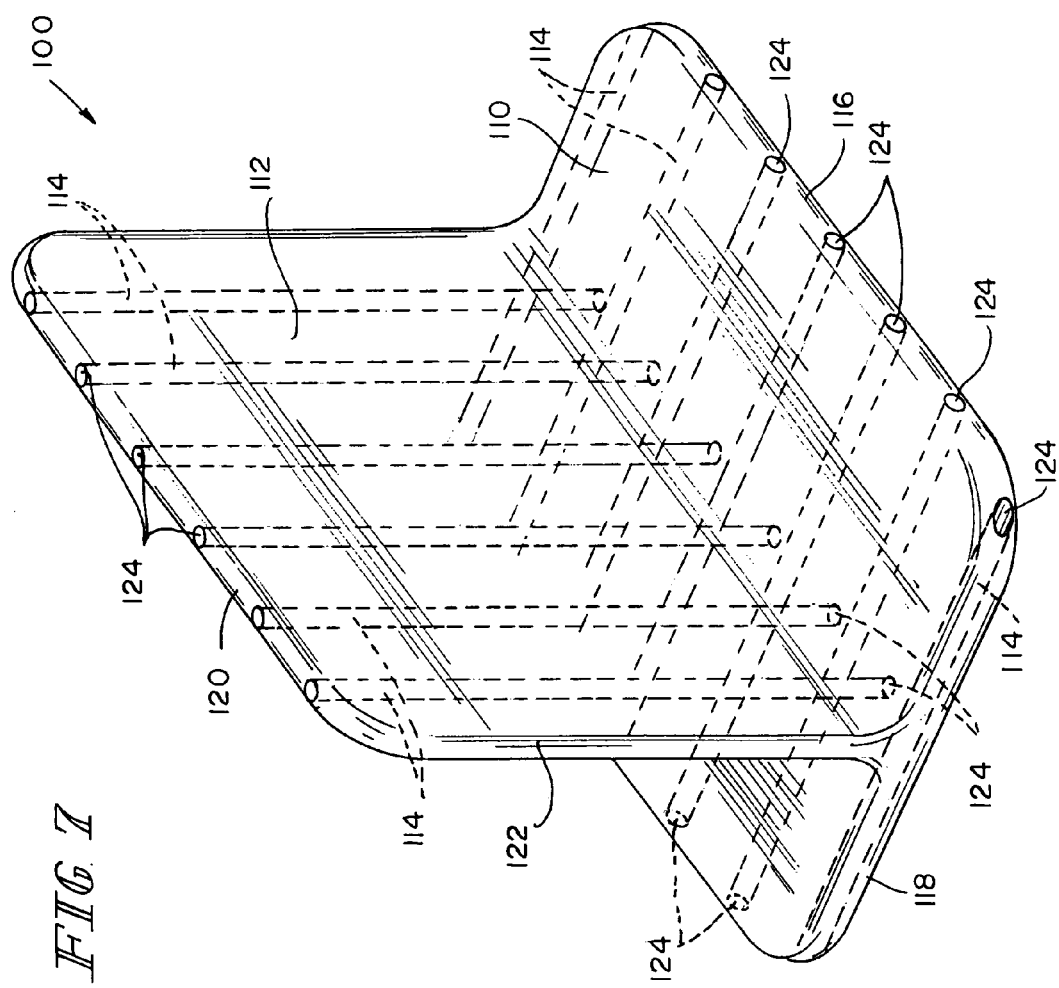

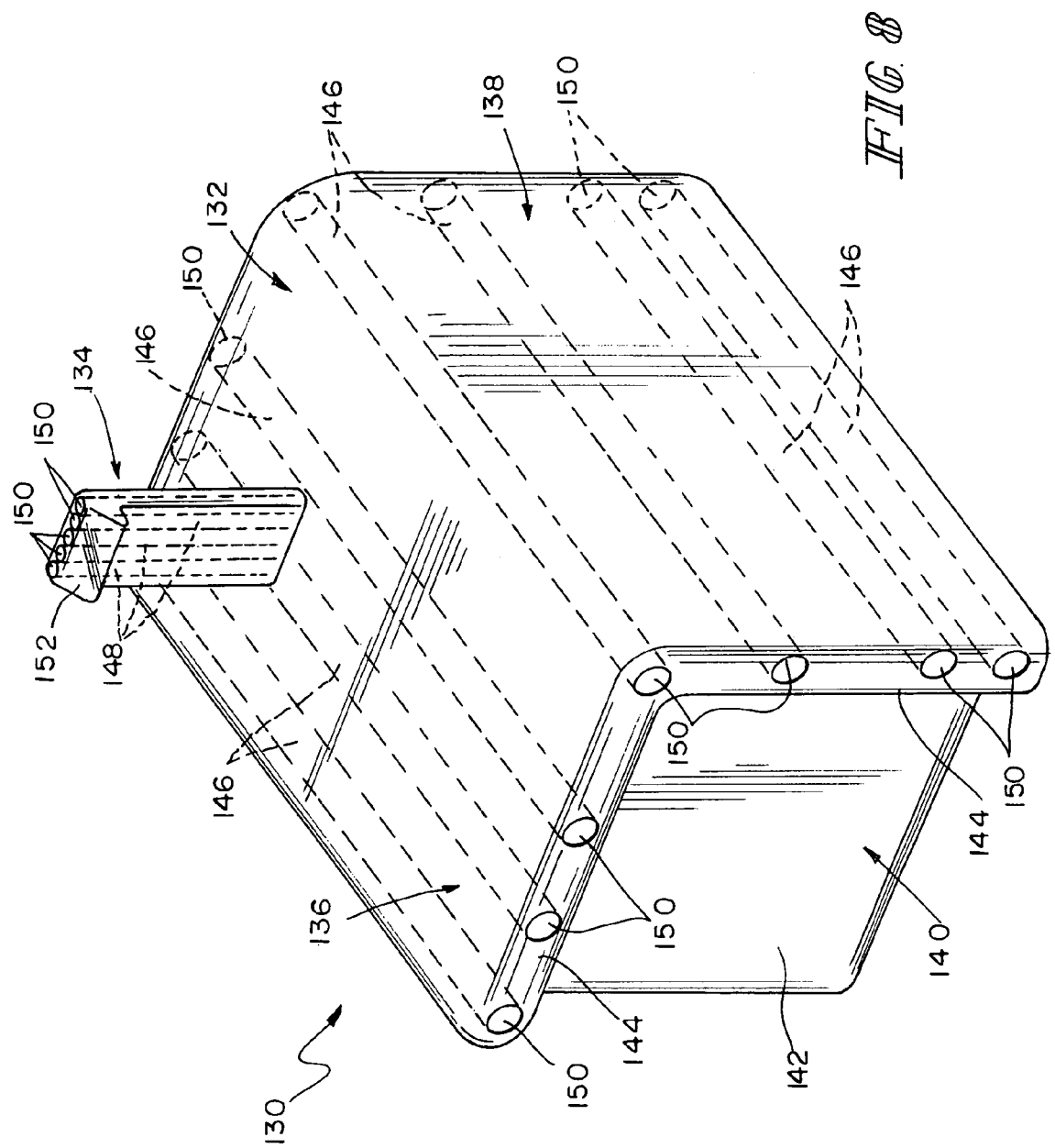

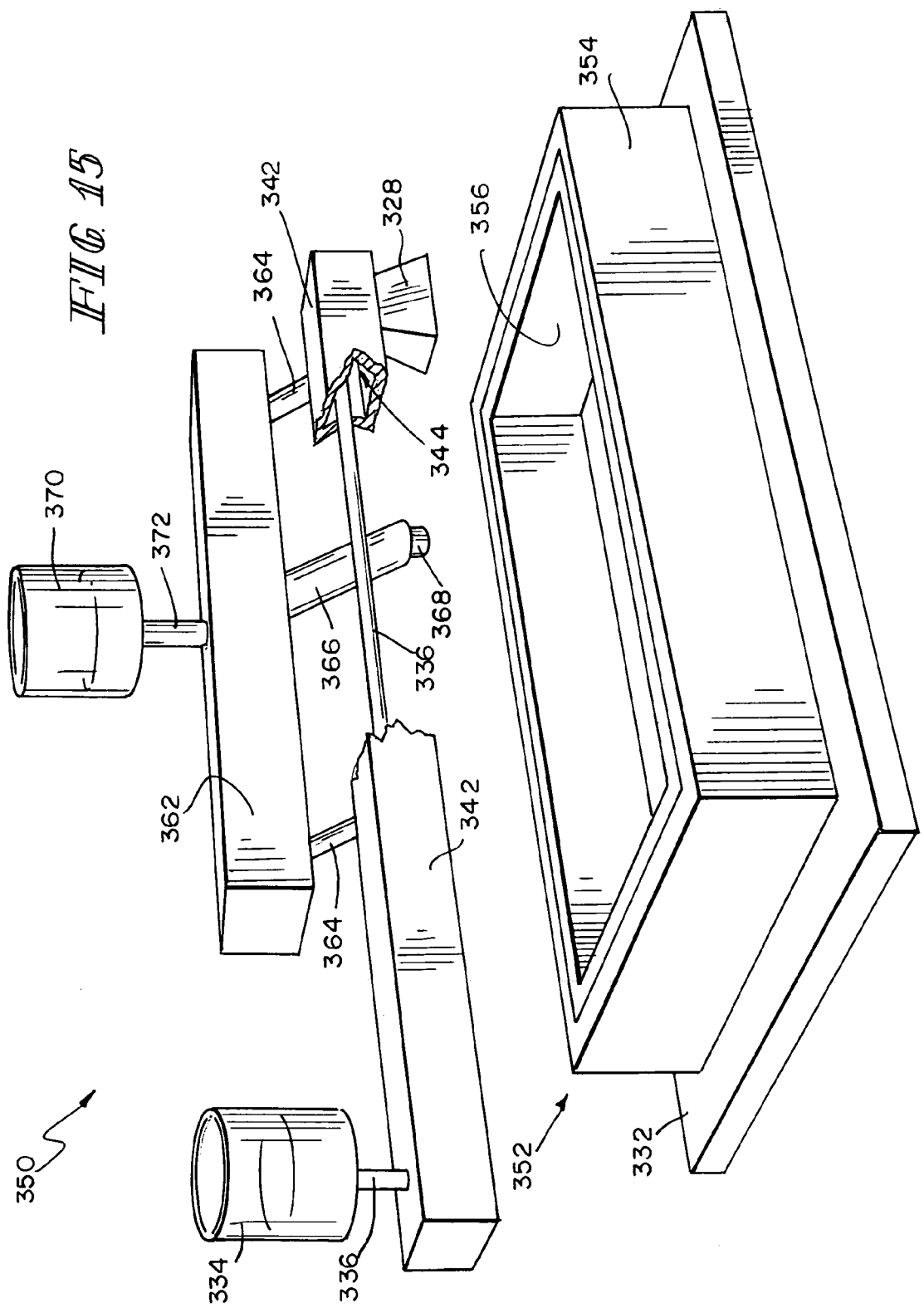

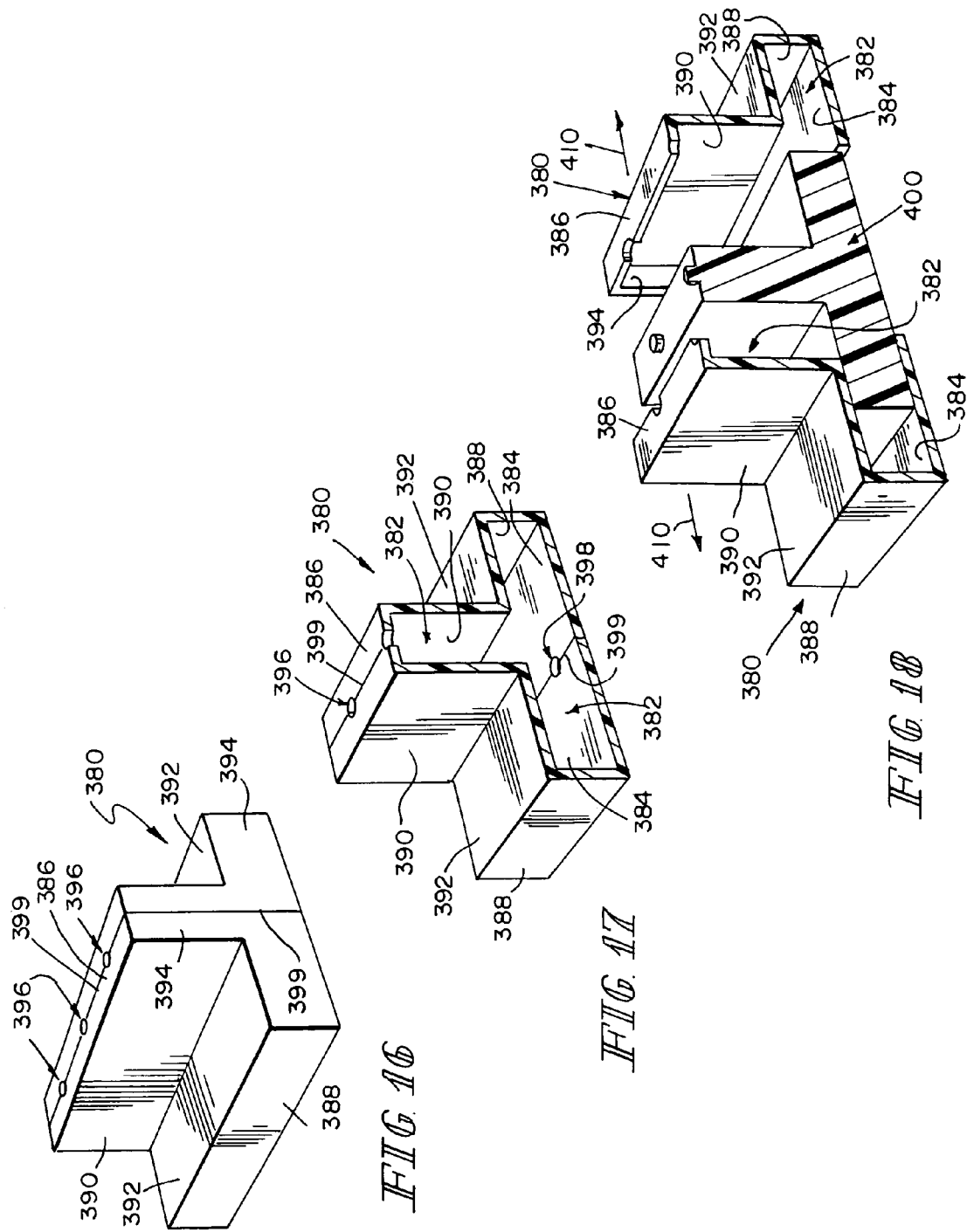

PROCESS FOR TEMPERING RAPID PROTOTYPE PARTS

This application claims the benefit, under 35 U.S.C. § 119(e), of U.S. Provisional Patent Application Ser. No. 60/378,518 which was filed May 7, 2002 and which is hereby expressly incorporated by reference herein.

BACKGROUND OF THE INVENTION

The present disclosure relates to a process for creating prototype parts, and particularly, to a process for creating rapid prototype parts using stereolithography, selective laser sintering (SLS), or casting techniques. More particularly, the present disclosure relates to a process for changing or enhancing the characteristics of prototypes made by stereolithography, SLS, or casting techniques.

Manufacturers who develop new products oftentimes have prototype parts of the new products made for evaluation purposes. In addition, prototype parts sometimes are used to create casts which, in turn, are used to create production parts. Processes for making rapid prototype parts include stereolithography, selective laser sintering (SLS), and casting non-metallic materials, such as resins. In stereolithography, laser energy is used to cure selected areas of successive cross sections of a liquid, photopolymer resin that is introduced into a container. The areas that are laser cured are based on cross sections of the prototype that are generated by a CAD system. The photopolymer solidifies in the specific areas exposed to the laser beam. Thus, the prototype is created layer-by-layer as the liquid resin is fed into the container. Using stereolithography, the transition from CAD data to a three-dimensional prototype is accomplished relatively quickly, sometimes in just a few hours. In SLS, successive layers of powdered materials are sintered or fused together in an environmentally controlled chamber by exposure to a carbon dioxide laser. Thermoplastics, investment casting wax, polycarbonate, and nylon are a few of the types of powdered materials that are used in SLS for the creation of three-dimensional prototypes. In prototype casting, a prototype part is made by pouring and/or vacuuming a resinous material into a mold.

While conventional stereolithography, SLS, and casting techniques are able to produce, in a relatively short period of time, three dimensional prototype parts having fairly complicated shapes, the parts produced by these techniques heretofore have been relatively brittle. As a result, prototype parts made in accordance with conventional rapid prototype production techniques are not very durable and are susceptible to breaking due to temperature changes, inadvertent impacts, routine handling, and the like.

SUMMARY OF THE INVENTION

According to this disclosure, a tempering process for changing and/or enhancing the characteristics of rapid prototype parts made by stereolithography, SLS, or casting techniques is provided. The tempering process includes creating voids in a rapid prototype part and filling the voids with a filler material. Depending upon the combination of materials used for the rapid prototype part and the filler, the prototype is rendered more durable, more flexible, more rigid, stronger, more temperature resistant, more elastic, and so on.

In some embodiments, the voids are created in the rapid prototype part as the part is created during the stereolithography or SLS process. In other embodiments, the voids are created in the part manually, such as by drilling, milling, or coring operations, after the stereolithography, SLS, or casting process is finished. The voids are created in any of a variety of shapes, including spherical cavities within the part, cellular cavities (i.e. honeycomb cavities) within the part, tunnels through the part, or channels on the part, and in any combination. In some embodiments, the tunnels are circular in cross section to minimize stress formation in the regions of the part adjacent the tunnels. The cavities, tunnels, and channels may be separated from each other or interconnected. Either after the voids are created or during creation of the parts with voids, the filler material is poured, injected, vacuumed, extruded, deposited, or otherwise introduced into the voids. Optionally, the exterior of the prototype may be treated or coated to further enhance the strength and/or durability of the prototype.

Additional features will become apparent to those skilled in the art upon consideration of the following detailed description of illustrative embodiments exemplifying the best mode of carrying out the process for tempering rapid prototype parts as presently perceived.

BRIEF DESCRIPTION OF THE DRAWINGS

The detailed description particularly refers to the accompanying figures in which:

FIG. 1 is a perspective view of a test sample made by a rapid prototype tempering process according to this disclosure showing the test sample being an elongated part, the test sample having a necked-down central region, and a pair of parallel filler-receiving cylindrical tunnels (in phantom) extending longitudinally from one end of the elongated test sample to the other end of the elongated test sample;

FIG. 2 is a sectional view taken along line 2-2 of FIG. 1;

FIG. 3 is a perspective view of a lid made by the rapid prototype tempering process according to this disclosure showing the lid having a substantially rectangular top wall, a perimeter flange extending downwardly from the top wall, and a plurality of filler-receiving cylindrical tunnels (in phantom) formed in the top wall and perimeter flange;

FIG. 5 is a sectional view, taken along line 5-5 of FIG. 4, showing filler material filling the space between in the top and bottom layers of the top wall and filling spaces formed in a perimeter flange of the lid;

FIG. 6 is a sectional view, similar to FIG. 5 but taken along line 6-6 of FIG. 4;

FIG. 7 is a perspective view of a T-shaped part made by the rapid prototype process according to this disclosure showing the T-shaped part having a plurality of filler-receiving cylindrical tunnels (in phantom) formed therethrough;

FIG. 8 is a perspective view of another part made by the rapid prototype process according to this disclosure showing a snap finger extending vertically upwardly from a main body of the part, the main body of the part having horizontally extending cylindrical tunnels (in phantom) which receive a filler material, and the snap finger having vertically extending cylindrical tunnels (in phantom) which also receive a filler material;

FIG. 15 is a diagrammatic view, similar to FIG. 14, showing a system having one print head that shoots a base material to form a part having voids and an extrusion head that deposits filler material into the voids of the base material as the part is formed;

FIG. 16 is a perspective view showing a thin-walled mold made from a base material;

FIG. 17 is a perspective view of the thin-walled mold, similar to FIG. 16 but sectioned transversely through a central region of the part, showing an internal cavity of the mold; and FIG. 18 is a perspective view, similar to FIG. 17, showing two halves of the thin-walled mold which is made from a base material being separated away from a prototype part made from a filler material which has been injected into the internal cavity of the mold.

DETAILED DESCRIPTION OF THE DRAWINGS

Figure 4:
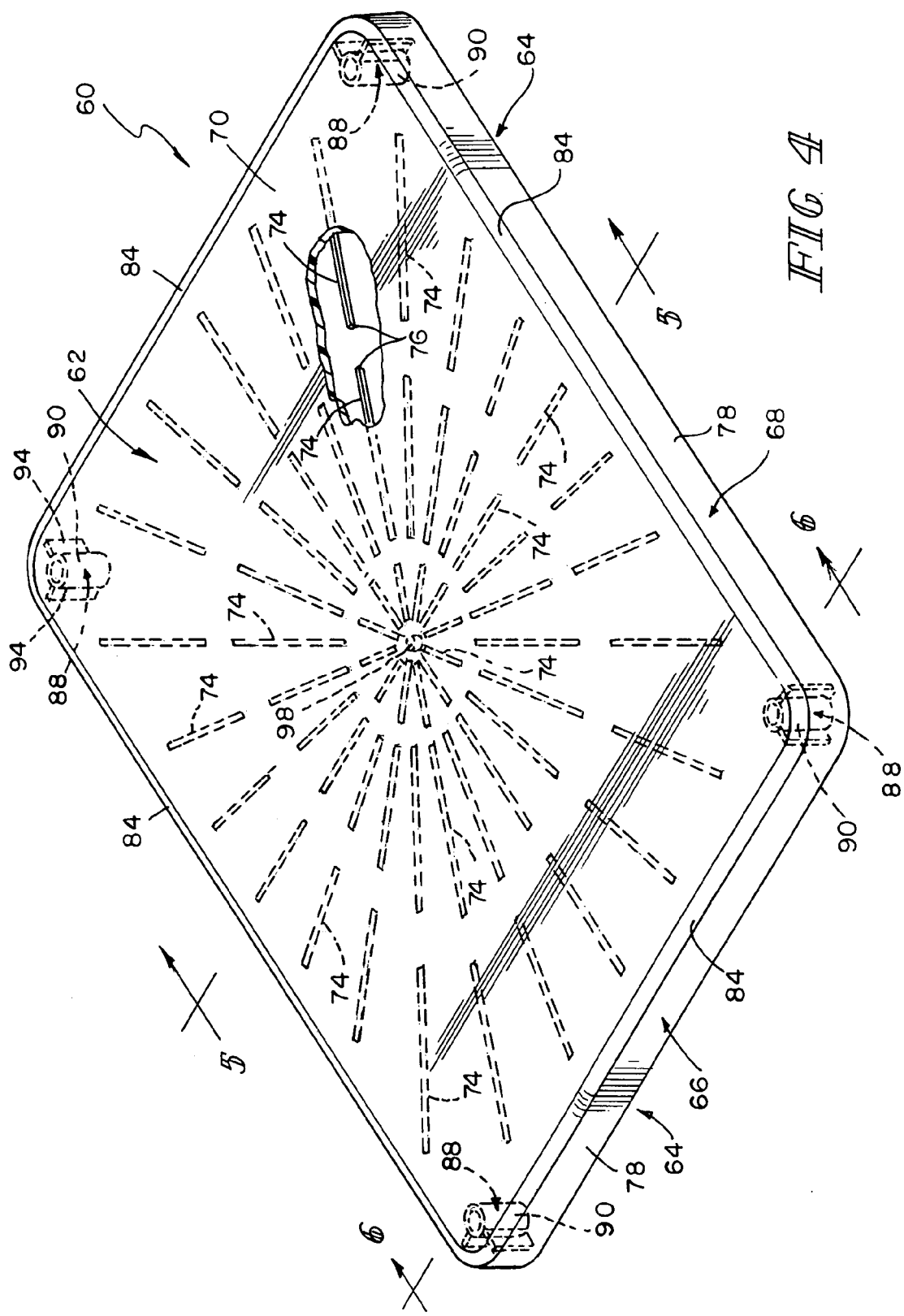
FIG. 4 is a perspective view of an alternative lid, also made by the rapid prototype tempering process according to this disclosure, showing the lid having a set of reinforcement partitions (in phantom) that are situated in an interior region of a top wall of the lid and that extend between a top layer of the top wall and a bottom layer of the top wall, a filler-receiving space being defined between the top and bottom layers and between the reinforcement partitions, and the reinforcement partitions being arranged in a pattern extending radially with respect to a center of the top wall.

A rapid prototype (RP) tempering process and parts made by the RP tempering process are disclosed herein. The RP tempering process changes and/or enhances one or more characteristics of rapid prototype parts that are made by stereolithography, selective laser sintering (SLS), or casting techniques. Tests of various test strip samples and the corresponding test results are disclosed in U.S. Provisional Patent Application Ser. No. 60/378,518 hereinabove incorporated by reference.

The RP tempering process comprises producing a rapid prototype part from a base material, creating voids in the rapid prototype part, and filling the voids with a filler material. As compared to prototype parts made of just a base material, the combination of a base material and a filler material in voids of the base material renders the prototype part more durable, more flexible, more rigid, stronger, more temperature resistant, more elastic, and so on, depending upon the base materials and filler materials used.

In some embodiments, the voids are created in the rapid prototype part as the part is created during the stereolithography, SLS, or casting process. In other embodiments, the voids are created in the part manually, such as by drilling, milling, or coring operations, after the stereolithography, SLS, or casting process is finished. The voids are created in any of a variety of shapes, including spherical cavities within the part, cellular cavities (i.e. honeycomb cavities) within the part, tunnels through the part, or channels on the part, and in any combination. In some embodiments, the tunnels are circular in cross section to minimize stress formation in the regions of the part adjacent the tunnels. The cavities, tunnels, and channels may be separated from each other or interconnected. After the voids are created, the filler material is poured, injected, vacuumed, or otherwise introduced into the voids. Optionally, the exterior of the prototype is treated or coated to further enhance the strength and/or durability of the prototype.

In some processes contemplated herein, the voids are created and filled with the filler material substantially simultaneously with the creation of the prototype part from the base material. In some processes contemplated herein, the voids are created simultaneously with the production of the prototype part. Machines having one or more print heads and/or one or more extrusion heads for depositing the base material (or multiple types of base materials) and one or more print heads and/or one more extrusion heads for depositing the filler material (or multiple types of filler material) are disclosed herein.

A number of different types of base materials and filler materials are contemplated by this disclosure. Some of the filler materials are non-brittle or flexible in nature and other filler materials are rigid in nature. Examples of filler materials according to this disclosure include polyesters, polystyrene, styrene, talc, calcium, fiberglass, titanium dioxide, methacrylate monomer, urethanes, adhesives, silicones, peroxide hardener, rubber resins, polyethers, acrylics, nylons, polyethylene, acetels, epoxies, teflon, ceramics, MC carbides, styrene monomers, cyandacrylate, acetone, and methyl ethyl ketone. Examples of base materials according to this disclosure include acrylics, epoxies, nylons, polypropylene, polystyrene, polyethylene, polyethers, urethanes, and polyesters. Many different RP parts having various combinations and mixtures of the above listed materials, in various proportions and in various viscosities, have been fabricated and evaluated. However, each and every type of substance that could possibly be used as a base material and/or filler material in a stereolithography or SLS process is considered to be within the scope of this disclosure. In those embodiments having a base material and a filler material of the same general type, the grade of the material used for the base material may differ from the grade of the material used for the filler material.

Prototype parts made according to the processes disclosed herein are better able to withstand impacts, twisting forces, and temperature changes than prototype parts made in accordance with prior art stereolithography, SLS, and casting processes, including prior art processes where different types of materials are mixed together for use as the base material prior to being exposed to a laser to cure the mixture of materials. In addition, the following characteristics have been changed and/or enhanced in accordance with the rapid prototype tempering process of this disclosure: tensile strength, torque strength, impact strength, elongation, elasticity, flexibility, rigidity, shape memory, and temperature resistance. It is believed that other characteristics, not yet identified, may be enhanced and/or changed by the rapid prototype tempering process, as well.

In some embodiments, the base materials, such as resins and powered materials, used in stereolithography, SLS, and casting processes to create the base prototype parts are relatively expensive as compared to the filler materials. Thus, if cost minimization is desired, a prototype part made in accordance with this disclosure may have a very thin exterior wall or surface and a lattice of very thin interior walls between which voids are defined. In such a prototype part, the filler material, when introduced into the voids, occupies a large majority of the volume of the prototype. In some prototypes of appropriate geometry, the lattice of interior walls in the interior region of the respective prototype is omitted such that the inner core of the prototype comprises filler material only. In addition, it is within the scope of this disclosure to fill the voids associated with one region of the prototype part with one type of filler material and to fill the voids associated with another region of the prototype part with another type of filler material so that different regions of the prototype part will have different changed and/or enhanced characteristics.

As mentioned above, the filler materials are poured, injected, vacuumed or otherwise introduced into the voids of the prototype part. Thus, a prototype part according to this disclosure may have at least one entry port or gate through which the filler material enters the part and at least one exit port or vent through which ambient air exits the part as the filler material enters the part. Of course, prototype parts having multiple entry and exit ports are within the teachings of this disclosure. In addition, it is within the scope of this disclosure for the entry and exit ports to be covered or blocked by plugs, seals, covers, blockers, or the like or otherwise closed after the voids of the prototype part are filled with filler material. If the external surface of the prototype part is treated or coated, in whole or in part, the treating or coating material may provide the means for closing the entry and exit ports.

Most of the filler materials according to this disclosure are liquids to which a catalyst is added prior to introduction of the filler material/catalyst mixture into the voids. A chemical reaction between the catalyst and the filler material results in the liquid material solidifying after a sufficient amount of time elapses. However, it is within the scope of this disclosure for the filler materials to be granular in nature and to be heated to melt the granules, thereby fusing the granules together, after the voids are filled with the granules. Filler materials that solidify without the addition of a catalyst, such as adhesives, are also within the scope of this disclosure. Also contemplated by this disclosure are filler materials comprising a mixture of substances. Examples of filler materials that have been used to fill voids in prototype parts comprising a base material of SOMOS 9100™ epoxy, that have been subjected to an ultimate compression test, and that have exhibited improved flexibility prior to fracture (or, in some instances, no fracture at all), as compared to prototype parts made of SOMOS 9100™ epoxy alone, include the following:

Polyester Resin and Styrene Monomers mixed together with a Peroxide hardener catalyst;

Polyester Resin and Styrene Monomers mixed together, with glass fibers added, and with a Peroxide hardener catalyst;

Polyester Resin and Styrene Monomers mixed together, with micro-balloons (i.e., hollow glass beads) added, and with a Peroxide hardener catalyst;

Polyester Resin and Styrene Monomers mixed together, with micro-balloons and glass fibers added, and with a Peroxide hardener catalyst;

Polyester Resin and Styrene Monomers mixed together, with a finishing epoxy resin added, and with a Peroxide hardener catalyst;

Polyester Resin and Styrene Monomers mixed together, with Titanium dioxide and talc added, and with a Peroxide hardener catalyst;

Polyester Resin and Styrene Monomers mixed together, with TEFLON® material added, and with a Peroxide hardener catalyst;

Polyester Resin and Styrene Monomers mixed together, with Cyandacrylate added, and with a Peroxide hardener catalyst;

Polyester Resin and Styrene Monomers mixed together, with NYLON® material added, and with a Peroxide hardener catalyst;

Polyester Resin and Styrene Monomers mixed together, with a urethane compound added, and with a Peroxide hardener catalyst;

Polyester Resin and Styrene Monomers mixed together, with silicone added, and with a Peroxide hardener catalyst;

Polyester Resin and Styrene Monomers mixed together, with Methacrylate Monomer added, and with a Peroxide hardener catalyst;

Cyandacrylate by itself with nothing added and no hardener catalyst;

Cyandacrylate, with acetone added, and with no hardener catalyst;

Cyandacrylate, with Methyl Ethyl Ketone added, and with no hardener catalyst;

Polyester Resin and Styrene Monomers mixed together, with Talc and fiberglass filaments added, and with a Peroxide hardener catalyst;

Polyester Resin and Styrene Monomers mixed together, with Talc and fiberglass filaments added, and with no hardener catalyst;

Silicone by itself and no hardener catalyst;

Silicone by itself and with a Peroxide hardener catalyst;

Methacrylate Monomer, with glass added, and with a Peroxide hardener catalyst;

Methacrylate Monomer, with glass added, and with no hardener catalyst;

Methacrylate Monomer by itself with a Peroxide hardener catalyst; and

Methacrylate Monomer by itself with no hardener catalyst.

Based on the above discussion, it should be understood that parts made from a wide variety of filler materials and from a wide variety of base materials are contemplated by this disclosure. It should also be understood that by making parts as disclosed herein having a filler material of the type disclosed herein occupying voids of a base material of the type disclosed herein, alternative pathways and mechanisms for stress relief, other than fracture, are created in the parts so as to redirect stresses through the parts. The filler materials contemplated by this disclosure generally exhibit low post-set shrinkage characteristics so that a stress-translating contact exists at the interface between the base material and the filler material. If it is determined to be desirable to have a cross-linked relationship between the base and filler materials, then a matrix material may be selected to have reactive group functionality with the pre-polymer (i.e., monomer or oligomer with a cross-linkable functional group). It is believed that cross-linking between the base and filler materials may enhance the stress-translating relationship between the base and filler materials as compared to parts having only a physical or frictional contact between the base and filler materials without cross-linking.

Referring now to the drawings, a test sample 20 made in accordance with the rapid prototype tempering process comprises a strip 22 of base material, in which a pair of voids 24 are formed, and a filler material 26 that fills voids 24 as shown in FIGS. 1 and 2. Sample 20 has a pair of spaced apart end regions 28 and a necked-down central region 30 interconnecting end regions 28. Illustrative sample 20 has a length of about 6.5 inches (16.51 cm) and a thickness of about 0.125 inches (0.3175 cm). The thickness of sample 20 is substantially uniform along its length. End regions 28 have a width of about 0.75 inches (1.905 cm) and central region 30 has a width of about 0.375 inches (0.9525 cm). Parallel side edges 34 of regions 28 neck down smoothly into respective side edges 36 of region 30 along arcuate edges 38 as shown in FIG. 1. The words "edge" and "edges" as used herein is intended to mean either a narrow surface or the intersection of surfaces, such as corners, as the case may be.

Each of voids 24 of illustrative sample 20 is formed as a straight cylindrical tunnel that extends longitudinally from a first end edge 32 of sample 20 to a second, opposite end edge (unnumbered in the FIGS.) of sample 20. Thus, voids 24 are parallel. The diameter of voids 24 is about 0.0625 inches (0.15875 cm) and the perpendicular distance between the axes defined by voids 24 is about 0.125 inches (0.3175 cm). A number of samples, like sample 20, were made with the same base material, but with different types of filler materials, and were subjected to bending tests and side-load tests as described in U.S. Provisional Patent Application Ser. No. 60/378,518 hereinabove incorporated by reference. For testing purposes, the base material was SOMOS 9100™ epoxy material. In addition, "untempered" samples, like sample 20 but without any voids or any filler material, were also tested. The bending tests and side-load tests demonstrated that samples (like sample 20) which were made in accordance with the RP tempering process disclosed herein, were more flexible, and less brittle than the "untempered" samples. Thus, the sample 20 having a base material with voids 24 that are filled with an appropriate filler material are more durable than similarly shaped parts made from the base material alone.

Referring now to FIG. 3, a lid 40 made by the rapid prototype tempering process according to this disclosure has a substantially rectangular top wall 42 and a perimeter rim or flange 44 extending downwardly from top wall 42. Lid 40 is made from a suitable base material of the type disclosed herein, such as base materials suitable for stereolithography or SLS. Rim 44 has a pair of end walls 46 and a pair of side walls 48. Walls 46 blend smoothly with walls 48 at rounded corner regions of lid 40. A plurality of voids 50 in the form of filler-receiving cylindrical tunnels are formed in top wall 42 and perimeter flange 44 of lid 40 as shown in FIG. 3 (in phantom). Voids 50 are sometimes referred to herein as "tunnels 50."

The tunnels 50 formed in top wall 42 extend side-to-side relative to lid 40 and are parallel with each other and with the ends of lid 40. The tunnels 50 formed in end walls 46 also extend side-to-side relative to lid and are parallel with each other. The tunnels 50 formed in side walls 48 extend end-to-end relative to lid 40 and are parallel with each other. When lid 40 rests on a horizontal surface (or on a container that has a horizontal upper end) each of tunnels 50 extends horizontally. In addition, none of tunnels 50 intersect any other tunnel 50.

Each tunnel 50 has an opening or port 52 at each end thereof. The openings 52 associated with the tunnels of end walls 46 and side walls 48 are located at the rounded corner regions of perimeter rim 44. The port 52 at one end of each tunnel 50 is considered to be a gate or inlet port 52 through which filler material is introduced into the respective tunnel 50 and the port 52 at the opposite end of each tunnel 50 is considered to be a vent or outlet port 52 through which ambient air exits the respective tunnel 50 as the tunnel is filled with filler material. Receipt of the filler material in tunnels 50 "tempers" lid 40 and enhances the durability of lid 40 by rendering lid 40 less brittle than if lid 40 were made from the base material alone.

An alternative lid 60, which has an external shape substantially the same as lid 40 and which also is made by the rapid prototype tempering process according to this disclosure, has a top wall 62 and a perimeter rim or flange 64 extending downwardly from top wall 62 as shown in FIG. 4. Flange 64 has a pair of end walls 66 and a pair of side walls 68. Walls 66 blend smoothly with walls 68 at rounded corner regions of lid 60. Top wall 62 comprises a thin top layer 70, a thin bottom layer 72 that is spaced from layer 70, and a set of reinforcement partitions or walls 74 that extend between layers 70, 72 in a void or interior region of top wall 62 as shown in FIGS. 5 and 6.

Partitions 74 are arranged in the interior region of top wall 62 in a pattern having alternating groups of three partitions and two partitions, each group of two or three partitions 74 being aligned along a respective imaginary radius extending from a center of top wall 62 as shown in FIG. 4. The angular spacing between adjacent radially aligned groups of partitions 74 is about fifteen degrees in the illustrative embodiment. Each partition 74 has a pair of opposite ends 76. Voids or spaces are defined between ends 76 of adjacent partitions 74 as shown best in FIG. 5.

Perimeter flange 64 has a thin outer layer 78, a thin inner layer 80, and a thin bottom layer 82 that interconnects the bottom regions of layers 78, 80 as shown in FIGS. 5 and 6. Layer 78 of flange 64 blends smoothly with top layer 70 of top wall 62 along a rounded perimeter edge or junction 84 of lid 60. Layer 80 of flange 64 blends with bottom layer 72 of top wall 62 of lid 60 along a junction 86, shown in FIG. 5. Layer 78 is spaced apart from layer 80 to define a void therebetween.

Lid 60 has a set of cylindrical bosses 88, each boss 88 extending downwardly from layer 72 of top wall 62 adjacent a respective corner region of lid 60. Each boss 88 comprises a cylindrical wall 90 which defines an associated central bore 92 as shown in FIG. 6. A pair of ribs 94 extend between each cylindrical boss 88 and portions of layer 80 associated with respective end walls 66 and side walls 68 near the corner regions of lid 60. Cylindrical tunnels or voids 96, which are smaller in diameter than bore 92, extend through cylindrical wall 96 such that an upper end of each tunnel 96 opens into the space defined between layers 70, 72 of top wall 62 and such that the lower end of each tunnel 96 provides an opening or vent at the lower end of the respective boss 88. In alternative embodiments, one or more gates and/or one or more vents are formed in other locations of lid 60.

Bottom layer 72 of top wall 62 is formed with a gate or inlet port 98 as shown in FIGS. 4 and 5 (in phantom in FIG. 4). After layers 70, 72, 78, 80, 82, partitions 74, bosses 88, and ribs 94 are fabricated from a base material using a stereolithography or SLS process, a filler material is injected through gate 98 into the various voids that exist in lid 60. As the filler material fills the various voids in lid 60, ambient air in the voids of lid 60 exits from lid 60 through tunnels 96. A sufficient amount of filler material is injected through port 98 to fill all of the voids present in lid 60. Receipt of the filler material in these various voids "tempers" lid 60 and enhances the durability of lid 60 by rendering lid 60 less brittle than if lid 60 were made from the base material alone.

A T-shaped part 100 made by the rapid prototype process according to this disclosure includes a first plate 110 and a second plate 112 extending perpendicularly from first plate 110 in a cantilevered manner as shown in FIG. 7. Plates 110, 112 are made from a base material. Part 100 has a plurality of voids or filler-receiving cylindrical tunnels 114 formed therethrough as shown in FIG. 7 (in phantom). The tunnels 114 associated with plate 110 extend between end edges 116 of plate 110 in parallel relation with each other and with side edges 118 of plate 110. The tunnels 114 associated with plate 112 extend from an end edge 120 of plate 112 to a bottom surface of plate 110 in parallel relation with each other and with side edges 122 of plate 112. In the illustrative example, the perpendicular distance between adjacent pairs of parallel tunnels 114 is substantially the same for all pairs of adjacent tunnels 114.

None of tunnels 114 intersect any other tunnel 114. However, lower portions of the tunnels 114 that extend through plate 112 are situated within plate 110 between central regions of pairs of adjacent tunnels 114 that extend through plate 110. Thus, the tunnels 114 associated with plate 112 are interlaced with the tunnels 114 associated with plate 110. Each tunnel 114 has an opening or port 124 at each end thereof. The port 124 at one end of each tunnel 114 is considered to be a gate or inlet port 124 through which filler material is introduced into the respective tunnel 114 and the port 124 at the opposite end of each tunnel 114 is considered to be a vent or outlet port 124 through which ambient air exits the respective tunnel 114 as the tunnel is filled with filler material. Receipt of the filler material in tunnels 114 "tempers" part 100 and enhances the durability of part 100 by rendering part 100 less brittle than if part 110 were made from the base material alone. Part 100 is exemplary of how a rib or flange in any particular part may be designed with voids to be filled with a filler material to change and/or enhance a characteristic of the rib.

Referring now to FIG. 8, a part 130 made by the rapid prototype process according to this disclosure has a main body 132 and a snap finger 134 extending vertically upwardly from main body 132. Finger 134 serves as a male snap member that mates with a female snap member. Main body 132 has a top wall 136, a side wall 138 extending downwardly from one end of top wall 136, and a block 140 appended to walls 136, 138. End surfaces 142 of block 140 are recessed inwardly from end surfaces 144 of walls 136, 138 such that portions of walls 136, 138 extend past end surfaces 142 of block 140. Main body 132 of part 130 has horizontally extending cylindrical tunnels 146 and snap finger 134 has vertically extending cylindrical tunnels 148 as shown in FIG. 8 (in phantom).

Tunnels 146 are parallel with each other. In addition, none of tunnels 146 intersect any other tunnel 146 or any of tunnels 148. Three of illustrative tunnels 146 extend end-to-end through top wall 136, three of illustrative tunnels 146 extend end-to-end through side wall 138, and one of illustrative tunnels 146 extends end-to-end through a corner junction where walls 136, 138 merge together. The perpendicular distance between some adjacent pairs of tunnels 146 is different than the perpendicular distance between other adjacent pairs of tunnels 146. Tunnels 148 are parallel with each other and are oriented perpendicularly to tunnels 146. A diameter of each tunnel 148 is smaller than a diameter of each tunnel 146. Tunnels 148 extend from an upper end of snap finger 134 to a bottom surface of main body 132 (not shown). Portions of tunnels 148 are situated in top wall 136 between two of tunnels 146.

Each of tunnels 146, 148 has an opening or port 150 at each end thereof. The port 150 at one end of each of tunnels 146, 148 is considered to be a gate or inlet port 150 through which filler material is introduced into the respective tunnel 146,148 and the port 150 at the opposite end of each tunnel 146,148 is considered to be a vent or outlet port 150 through which ambient air exits the respective tunnel 146, 148 as the tunnel is filled with filler material. Receipt of the filler material in tunnels 146, 148 "tempers" part 130 and enhances the durability of part 130 by rendering part 130 less brittle than if part 130 were made from the base material alone. As a result of the reduced brittleness of part 130, snap finger 136 is able to deflect without breaking when some other part (not shown) engages a ramp surface 152 situated at an upper end of finger 134. Snap fingers similar to finger 134 on parts similar to illustrative part 130 made in accordance with the RP tempering processes disclosed herein have been repeatedly snapped onto a female part 100 times during a life cycle test without breaking.

Figure 9:
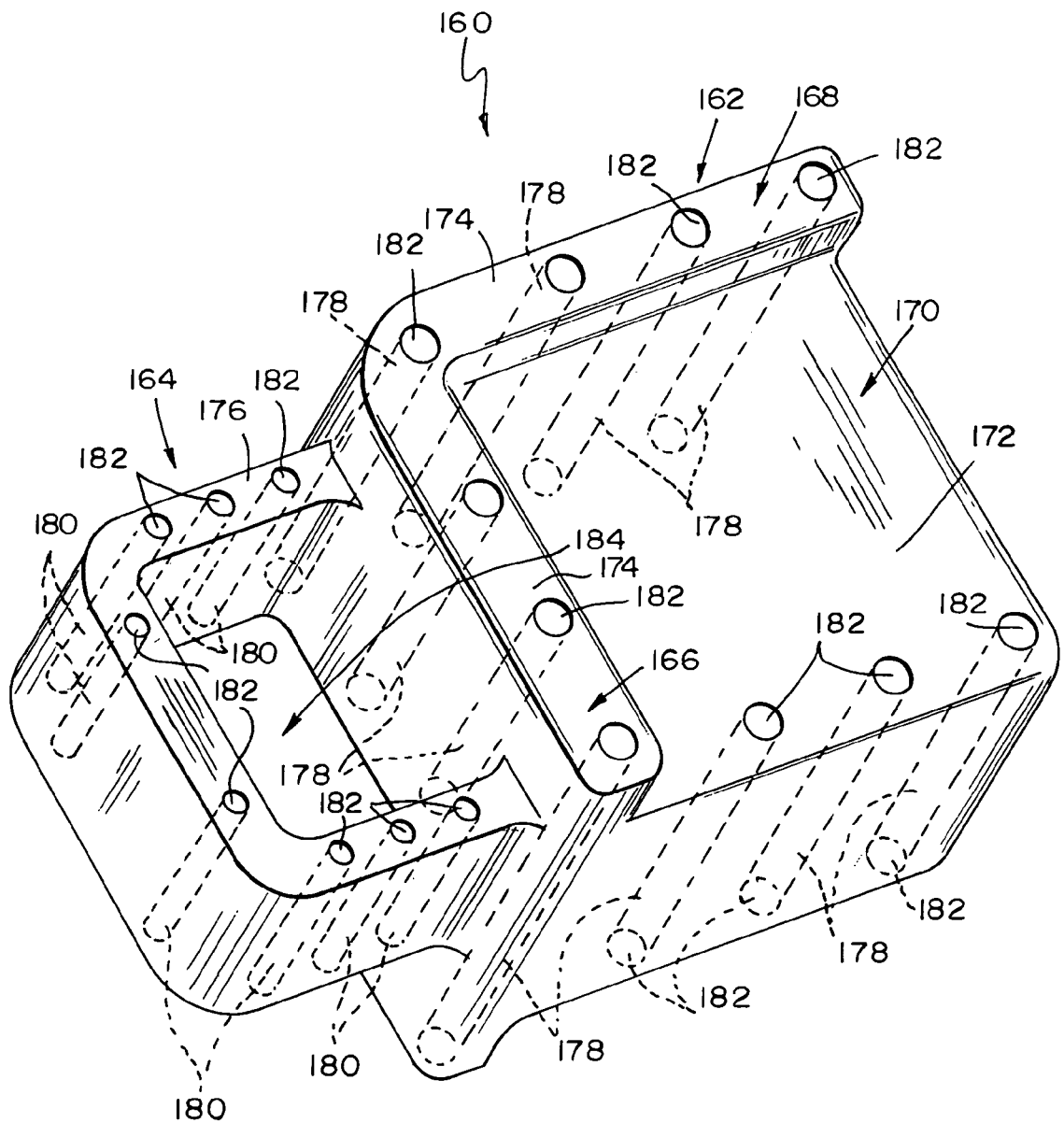
FIG. 9 is a perspective view of yet another part made by the rapid prototype process according to this disclosure showing a loop extending from a main body of the part and a plurality of parallel cylindrical tunnels (in phantom) formed in the loop and the main body.

Referring now to FIG. 9, a part 160 made by the rapid prototype process according to this disclosure comprises a main body 162 and a loop 164 extending from main body 162. Loop 164 may serve as a female snap member to which a male snap member couples. Main body 162 has a front wall 166, a side wall 168 extending rearwardly from one end of front wall 166, and a block 170 appended to walls 166, 168. Loop 164 is appended to front wall 166. An upper surface 172 of block 170 and a lower surface (not shown) of block 140 are recessed inwardly from end surfaces 174 of walls 166, 168 such that portions of walls 166, 168 extend past upper surface 172 and the lower surface of block 170. In addition, loop 164 has an upper surface 176 and a lower surface (not shown) that are spaced-apart by a distance less than the distance by which end surfaces 174 of walls 166, 168 are spaced apart.

Main body 162 of part 160 has a set of voids in the form of parallel, cylindrical tunnels 178 and loop 164 has a set of voids in the form of parallel, cylindrical tunnels 180 as shown in FIG. 9 (in phantom). Tunnels 178 are each parallel with tunnels 180. None of tunnels 178, 180 intersect any other tunnel 178, 180. Three of illustrative tunnels 178 extend through front wall 166, three of illustrative tunnels 178 extend through side wall 168, one of illustrative tunnels 178 extends through a corner junction where walls 166, 168 merge together, and three of illustrative tunnels 178 extend through block 172. A diameter of each tunnel 180 is smaller than a diameter of each tunnel 178.

Each of tunnels 178, 180 has an opening or port 182 at each end thereof. The port 182 at one end of each of tunnels 178, 180 is considered to be a gate or inlet port 182 through which filler material is introduced into the respective tunnel 178,180 and the port 182 at the opposite end of each tunnel 178,180 is considered to be a vent or outlet port 182 through which ambient air exits the respective tunnel 178, 180 as the tunnel is filled with filler material. Receipt of the filler material in tunnels 178, 180 "tempers" part 160 and enhances the durability of part 160 by rendering part 160 less brittle than if part 160 were made from the base material alone. Loop 164 cooperates with front wall 166 to form an opening 184 in which another part (not shown) may be inserted or snapped. A bump, ledge or groove may be formed on loop 164 adjacent opening 184 for mating with the male snap member. Loops similar to loop 164 on parts similar to illustrative part 160 made in accordance with the RP tempering processes disclosed herein have had male snap members repeatedly snapped thereon 100 times during a life cycle test without breaking.

Figure 10:
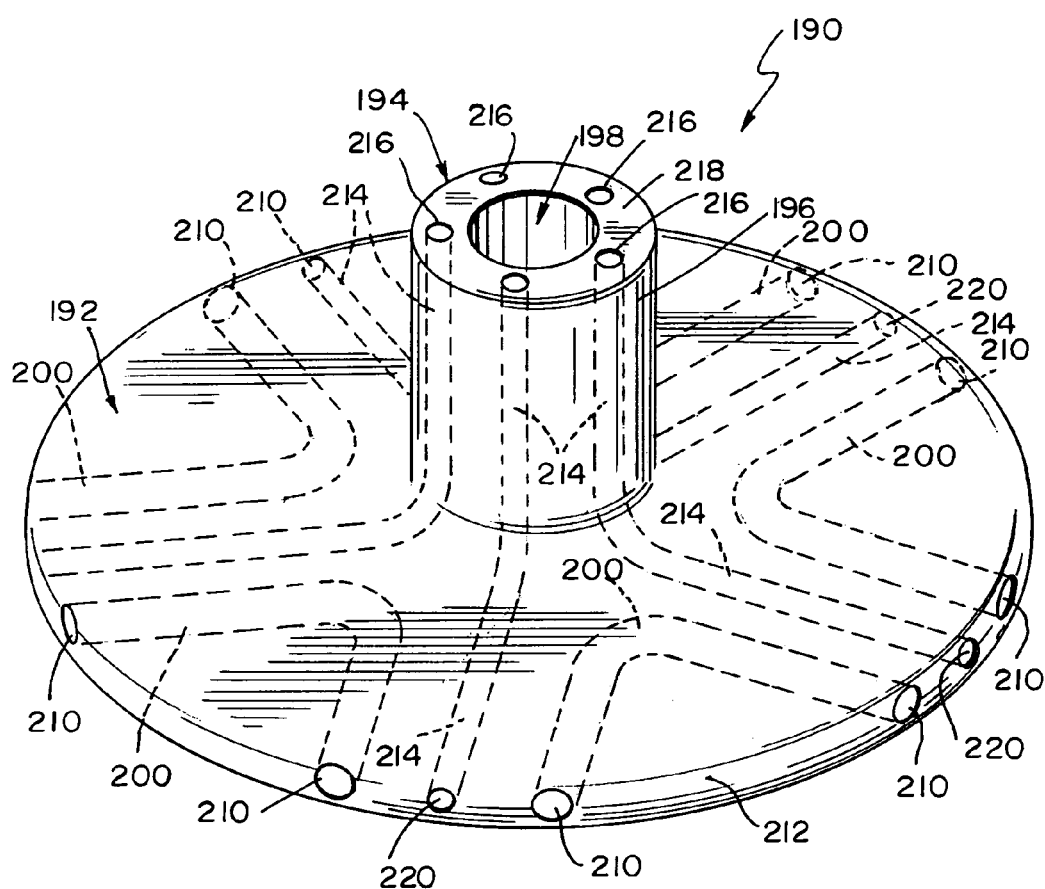
FIG. 10 is a perspective view of still another part made by the rapid prototype process according to this disclosure showing a cylindrical boss extending upwardly from a round disk and showing a number of tunnels being formed in the boss and the disk.

Referring to FIG. 10, a part 190 made by the rapid prototype process according to this disclosure comprises a round disk 192 and a cylindrical boss 194 extending upwardly from a central region of disk 192. Boss 194 comprises a cylindrical side wall 196 that defines a central bore 198 which extends all the way through part 190 in some embodiments and which terminates within part 190 in other embodiments. Part 190 has a first set of voids or tunnels 200 which are situated within disk 192 and which terminate at respective pairs of ports or openings 210 formed in an edge 212 of disk 192. Tunnels 200 are bent so as to curve within disk 192. Illustratively, tunnels 200 have straight portions that extend into disk 192 from respective openings 210 and elbow portions that interconnect the straight portions. Part 190 has a second set of voids or tunnels 214 that extend between respective openings or ports 216 formed in an upper edge 218 of boss 194 and ports 220 formed in edge 212 of disk 192. Tunnels 214 are bent so as to curve within a region of disk 192 beneath boss 194. Illustratively, tunnels 214 each have straight portions extending from respective ports 216, 220 and elbow portions that interconnect the straight portions.

Tunnels 200 have a uniform diameter at all locations therealong. Similarly, tunnels 214 have a uniform diameter at all locations therealong. However, the diameter of tunnels 200 is larger than the diameter of tunnels 214 in the illustrative embodiment. The port 210 at one end of each of tunnel 200 is considered to be a gate or inlet port 210 through which filler material is introduced into the respective tunnel 200 and the port 210 at the opposite end of each tunnel 200 is considered to be a vent or outlet port 210 through which ambient air exits the respective tunnel 200 as the tunnel 200 is filled with filler material. Similarly, for each tunnel 214, one of the associated ports 216, 220 is considered to be a gate or inlet port 216, 220 through which filler material is introduced into the respective tunnel 214 and the other of the associated ports 216, 220 is considered to be a vent or outlet port 216, 220 through which ambient air exits the respective tunnel 214 as the tunnel 214 is filled with filler material.

Receipt of the filler material in tunnels 200, 214 "tempers" part 190 and enhances the durability of part 190 by rendering part 190 less brittle than if part 190 were made from the base material alone. Part 190 is exemplary of how a cylindrical boss 194 in any particular part may be designed with voids to be filled with a filler material to change and/or enhance a characteristic of the boss 194. Such a boss 194 may have a bolt or screw threaded into bore 198, or alternatively, an insert configured for receipt of a bolt or screw may be press fit into bore 198, without fracturing boss 194. Parts similar to part 190 having bosses similar to boss 194 made in accordance with the RP tempering processes disclosed herein have had screws threaded into the bosses and then back out again 100 times during a life cycle test without breaking.

Figure 11:
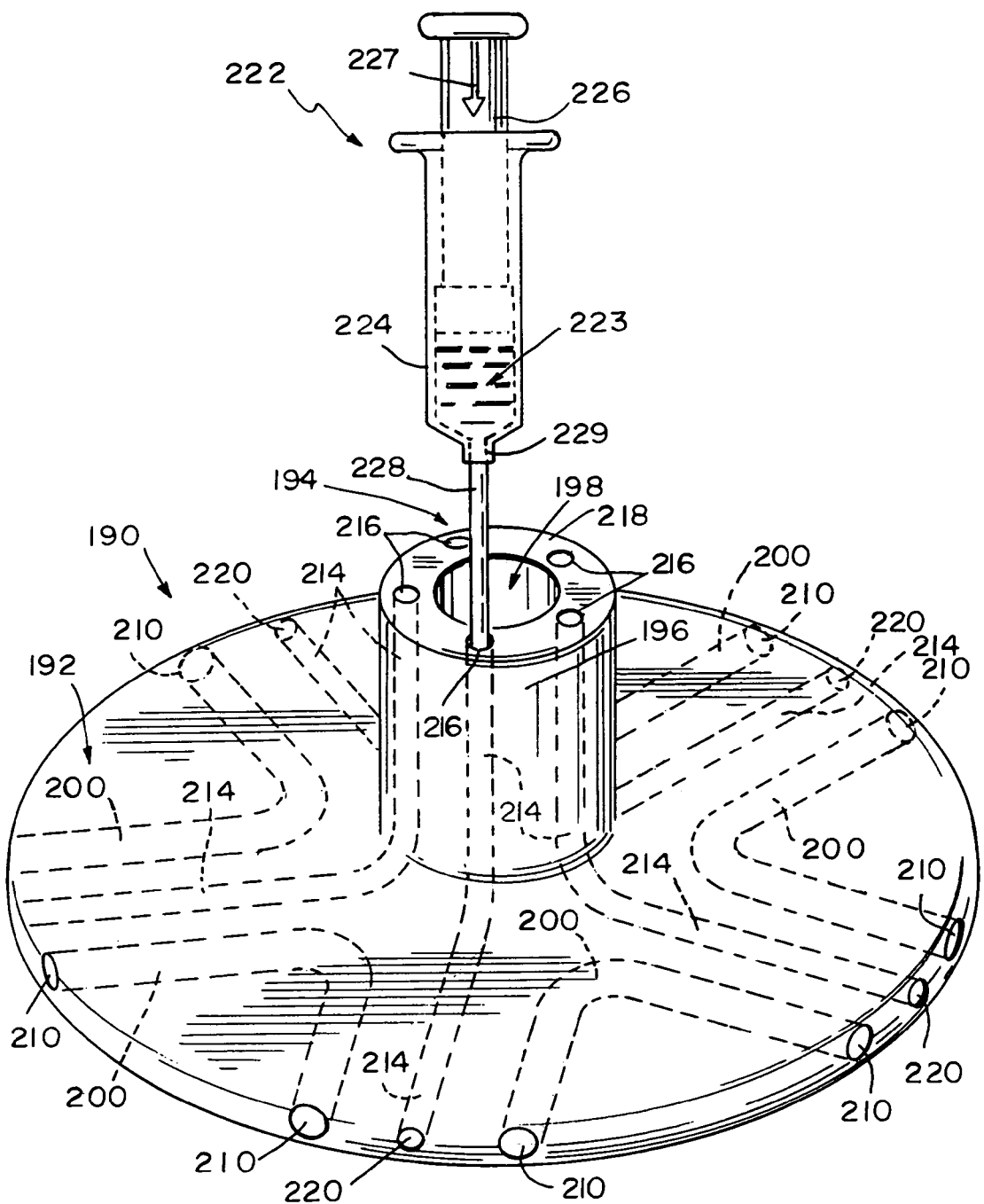
FIG. 11 is a perspective view, similar to FIG. 10, showing a syringe positioned for injecting filler material into one of the tunnels of the part.

Some parts made in accordance with this disclosure may have filler material manually injected through the gates into the associated voids formed in the parts. For example, a syringe 222 may be used to manually inject filler material 223 into parts, such as part 190, as shown in FIG. 11. Illustrative syringe 222 has a main barrel 224 which receives the filler material 223 therein, a plunger 226 which is pressed in direction 227 to force the filler material out of the barrel 224, and an elongated tube 228 which extends from an exit port 229 of barrel 224. An end of tube 228 distal from barrel 224 is configured to seat against port 216 so that, as plunger 226 moves in direction 227, filler material 223 moves out of barrel 224, through tube 228, and into the associated void 214. Syringe 222 is used to fill each of the other voids 214 of part 190 in a similar manner.

Syringes of various sizes with tubes of various sizes and shapes may be made available so that a user may select an appropriately sized syringe having an appropriately sized and shaped tube depending upon the size of the void to be filled and depending upon the size of the gate leading into the void. For example, a larger syringe (not shown) having a larger tube may be used to fill voids 200 of part 190. Any of the parts disclosed herein that have gates and vents may be filled manually with one or more syringes.

Figure 12:
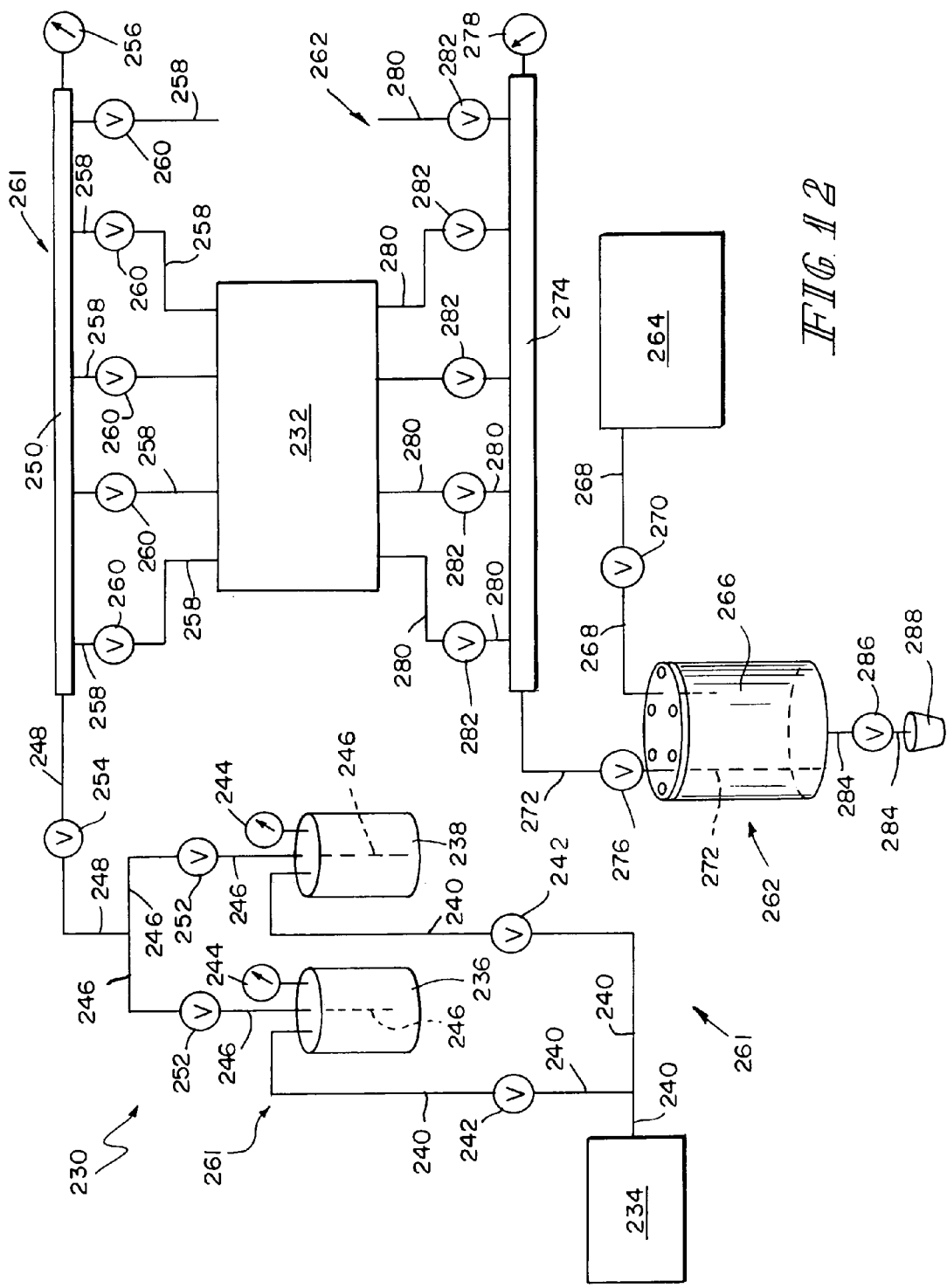
FIG. 12 is a diagrammatic view of a system that is operable to introduce a filler material into voids formed in a part made from a base material.

A system 230 that is operable to introduce a filler material into one or more voids formed in a part made from a base material is shown diagrammatically in FIG. 12. The part having voids to be filled with the filler material is shown in FIG. 12 generically at block 232. No voids are illustrated in block 232, but it should be understood that part 232 may have any of the various types of voids described herein. Furthermore, it should be understood that part 232 has at least one gate or inlet opening through which filler material is introduced into the one or more voids of part 230 and at least one vent or outlet opening through which ambient air exits part 232 as the filler material is introduced into the one or more voids in part 232.

System 230 comprises a positive pressure source 234 which is operable to apply positive pressure to first and second tanks or containers 236, 238, respectively, through a set of lines 240. Tank 236 contains a primary filler material, such as a resin, for example, and tank 238 contains a catalyst. A pair of pressure-regulating valves 242 are interposed in lines 240, one of valves 242 being operable to adjust the pressure applied to first tank 236 and the other of valves 242 being operable to adjust the pressure applied to second tank 238. The term "lines" as used in this disclosure is intended to mean all types of conduits, passages, hoses, pipes, spaces, and the like through which a gas or liquid may flow. Thus, the term "lines" as used herein, may be rigid or flexible in nature.

Each tank 236, 238 has a respective pressure gauge 244 associated therewith for measuring the respective pressure in tanks 236, 238. Gauges 244 may be analog or digital gauges. In some embodiments, gauges 244 may produce signals that are input to a controller which is, in turn, coupled electrically to valves 242. Thus, gauges 244 and the associated controller and electrical circuitry may provide system 230 with a feedback portion for automatically adjusting valves 242 so as to maintain the pressures in tanks 236, 238 substantially at programmed target pressures.

System 230 further comprises a pair of outlet lines 246, each of which extends from a respective tank 236, 238 to a main supply line 248 which, in turn, is coupled to a supply manifold 250 as shown in FIG. 12. A pair of metering valves 252 is interposed in lines 246, one of valves 252 being operable to adjust the flow of the primary filler material from tank 236 and the other of valves 252 being operable to adjust the flow of the catalyst from tank 238. The primary filler material and the catalyst mix together adjacent the junction between lines 246 and line 248. Optionally, a mixing chamber (not shown) may be provided in system 230 and the material and catalyst from respective lines 246 may be introduced into the mixing chamber through respective check valves, which check valves operate to prevent the contents of tanks 236, 238 from mixing together upstream of the mixing chamber. A main supply valve 254 is interposed in line 248 and is operable to control the flow of the mixture of the primary filler material and the catalyst (hereinafter referred to as just the "filler material") into flow passages of supply manifold 250.

System 230 has a gauge 256 which is associated with manifold 250 and which measures the fluid pressure in the internal passages of manifold 250. System 230 also has a number of injection lines 258, each of which extends from an associated outlet port (not shown) of manifold 250 and each of which has an end spaced from manifold 250 through which filler material is injected into an associated void of part 232. In some embodiments, the ends of lines 258 are configured for direct coupling to a respective gate of part 232 and in other embodiments, various adapters (not shown) are coupleable to the ends of lines 258. Various sized adapters may be configured for coupling to gates of different sizes. A control valve 260 is interposed in each line 258 for controlling the flow of filler material through the respective line 258.

In the illustrative example, five injection lines 258 extend from manifold 250, but only four of these lines are coupled to associated gates of part 232. Thus, one of lines 258 is not used in the illustrative example. Therefore, the valve 260 associated with this unused line 258 remains closed while the voids of parts 232 are filled via the other four lines 258. Although five injection lines 258 are shown in the illustrative example, system 230 may be configured with more or less than five lines 258, at the option of the system designer.

In addition to the components of system 230 that are described above and that provide system 230 with a positive-pressure subsystem 261 which operates to force filler material into the one or more voids of part 232, system 230 may optionally include a negative-pressure subsystem 262 as shown in FIG. 12. Subsystem 262 comprises a negative pressure source 264, such as a vacuum pump, which is operable to apply vacuum or negative pressure to a vacuum accumulator 266 through a line 268. A pressure-regulating valve 270 is interposed in line 268 and is operable to adjust the negative pressure applied to accumulator 266 from source 264. In some embodiments, a pressure gauge (not shown) is provided for measuring the negative pressure in accumulator 266.

Subsystem 262 further comprises an outlet line 272 which extends from accumulator 266 to a suction manifold 274 as shown in FIG. 12. A metering valve 276 is interposed in line 272 and is operable to adjust the amount of negative pressure from accumulator 266 that is applied to the internal passages of manifold 274. Subsystem 262 has a gauge 278 which is associated with manifold 274 and which measures the negative pressure in the internal passages of manifold 274.

Subsystem 262 also has a number of suction lines 280, each of which extends from an associated outlet port (not shown) of manifold 274 and each of which has an end spaced from manifold 274 through which suction is applied to an associated void of part 232. In some embodiments, the ends of lines 280 are configured for direct coupling to a respective vent of part 232 and in other embodiments, various adapters (not shown) are coupleable to the ends of lines 280. Various sized adapters may be configured for coupling to vents of different sizes. The same adapters that are coupleable to lines 258 may also be coupleable to lines 280. These adapters may have tips that are threaded, tapered, rounded, or cylindrical, for example. A control valve 282 is interposed in each line 280 for controlling the application of suction to the vents of part 232 through the respective line 280.

In the illustrative example, five suction lines 280 extend from manifold 274, but only four of these lines 280 are coupled to associated vents of part 232. Thus, one of lines 280 is not used in the illustrative example. Therefore, the valve 282 associated with this unused line 280 remains closed while the voids of part 232 are filled with filler material. Although five suction lines 280 are shown in the illustrative example, subsystem 262 may be configured with more or less than five lines 280, at the option of the system designer. The application of negative pressure to the vents of part 232 via lines 280 promotes the ingress of filler material into the voids of part 232.

Subsystem has a drain line 284 extending from accumulator 266 and a drain valve 286 interposed in line 284. In the event that any filler material or other liquid, such as condensate, for example, is inadvertently suctioned into accumulator 266, valve 286 may be moved from its normally closed position to an opened position to allow the filler material and/or liquid in accumulator 266 to drain into a receptacle 288 placed adjacent an open end of line 284.

Figure 13:
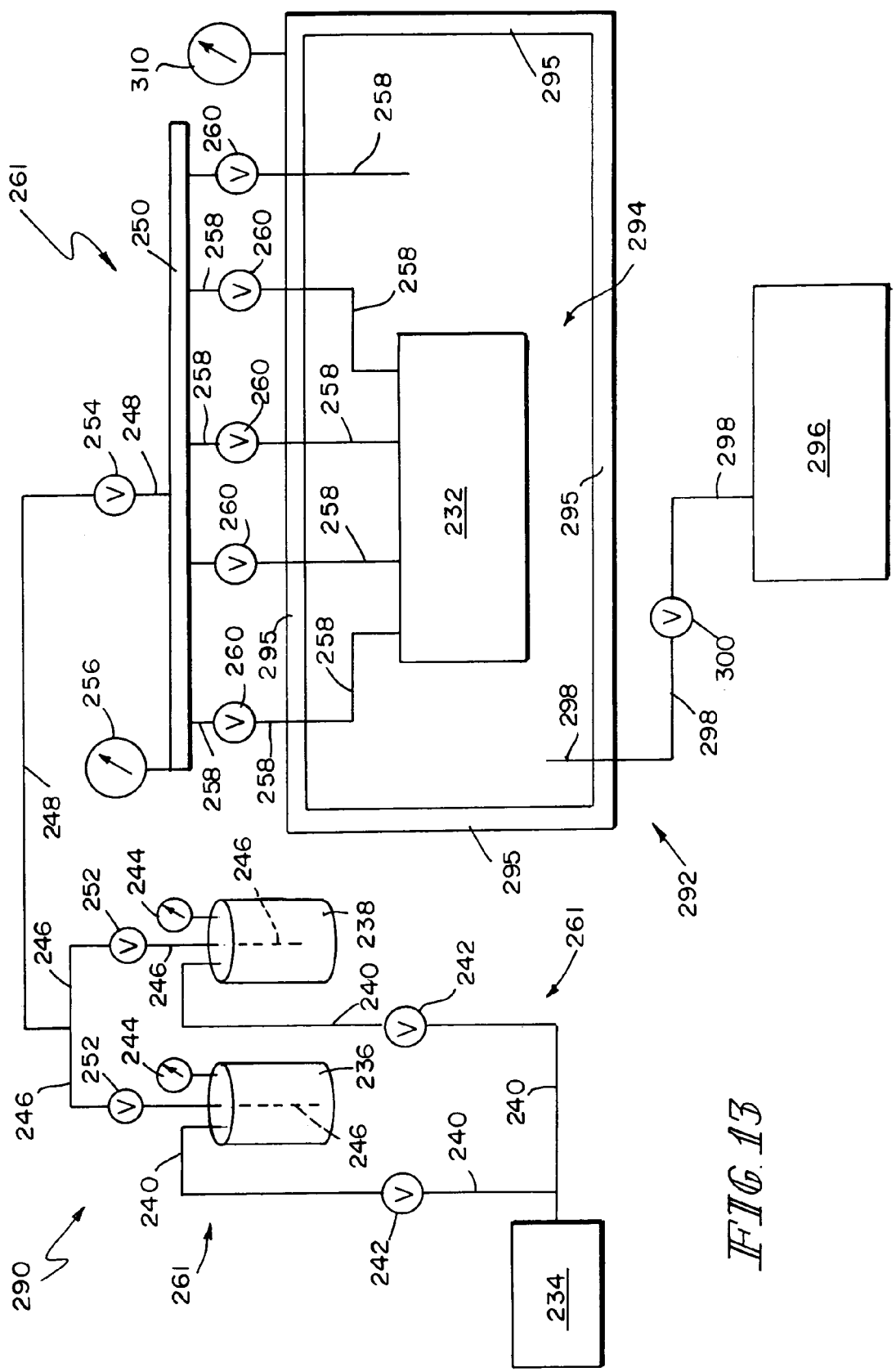
FIG. 13 is a diagrammatic view, similar to FIG. 12, of another system that is operable to introduce a filler material into voids formed in a part made from a base material.

A system 290 has a positive-pressure subsystem 261 that is substantially the same as that of system 230 but has an alternative negative-pressure subsystem 292 as shown diagrammatically in FIG. 13. The components of subsystem 261 of each of systems 230, 290 are denoted with like reference numbers. Thus, system 290 has injection lines 258 that couple to gates of part 232, either directly or via adapters, and through which filler material is introduced into voids of part 232. However, subsystem 292 of system 290 has a vacuum chamber 294 which is defined between a set of chamber walls 295. Part 232 is situated within chamber 294 and a negative pressure is created in chamber 294 by a negative pressure source 296. Source 296 communicates with chamber 294 through a suction line 298 and a valve 300 that is interposed in line 298. A gauge 310 measures the negative pressure created in chamber 294 by source 296.

In the illustrative embodiment, lines 258 are routed into chamber 294 through a top wall of the chamber walls 295 and line 298 is routed into chamber 294 through a bottom wall of the chamber walls 295. Thus, walls 295 have appropriate openings or spaces through which lines 258, 298 pass, or alternatively, openings or spaces in walls 295 provide a portion of lines 258, 298. The interface between chamber walls 295 and lines 258, 298 is suitably sealed, such as by seals, gaskets, or the like, so that a desired negative pressure may be established in chamber 294. The vents (not shown) of part 232 are exposed to the negative pressure in chamber 294 which promotes the ingress of filler material into the voids of part 232.

Figure 14:
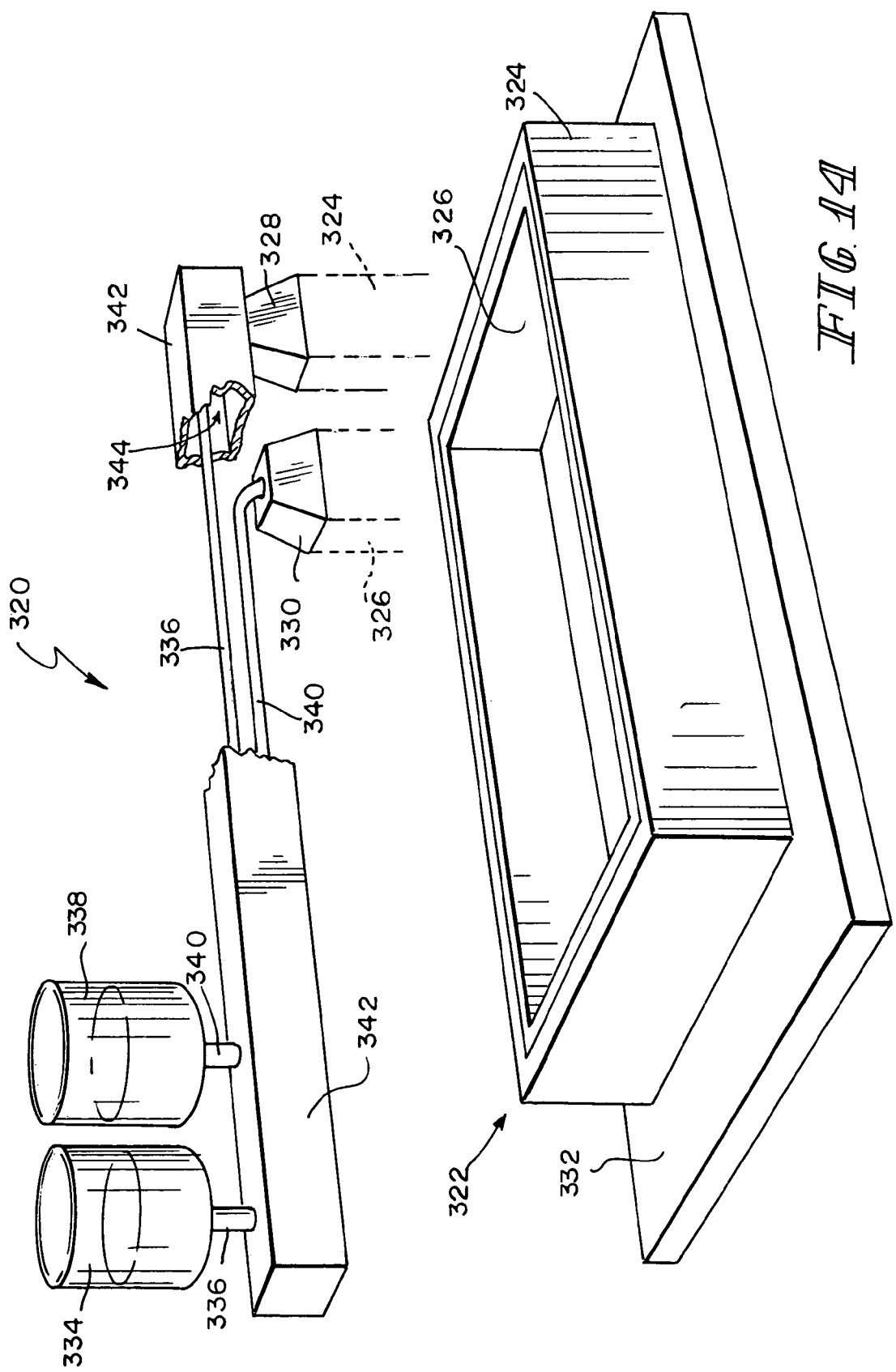
FIG. 14 is a diagrammatic view showing a system having two print heads, one of which shoots a base material to form a part having voids and another of which shoots a filler material into the voids as the part is formed.

A system 320 for fabricating a prototype part 322 in such a manner that one or more voids are created in a base material 324 and are filled with a filler material 326 substantially simultaneously is shown diagrammatically in FIG. 14. System 320 has a first printer head 328, a second printer head 330, and a substrate or table 332. A first container or vat 334 of base material 324 is coupled to printer head 328 by a first line 336 and a second container or vat 338 of filler material 326 is coupled to printer head 330 by a second line 340. In the illustrative embodiment, printer heads 328, 330 and containers 334, 338 are coupled to an arm 342 having an interior region 344 in which a majority of lines 336, 340 are situated.

Printer heads 328, 330 are operable to shoot material 324, 326, respectively, downwardly toward substrate 332. Heads 328, 330 may shoot material 324, 326 simultaneously or may alternate shooting material 324, 326 as desired. In some embodiments, printer heads 328, 330 have nozzles that are adjustable to adjust the exit or spray pattern of material 324, 326, respectively. During creation of part 322 in some embodiments, arm 342 is moved by a suitable drive mechanism (not shown), such as a lead screw drive, hydraulic cylinder, robotic arm, or other type of actuator which may act through a linkage, pulleys, cables, or other type of transmission assembly to move printer heads 328, 330 in an appropriate manner as dictated by the shape of part 322. During creation of part 322 in other embodiments, printer heads 328, 330 may remain stationary while table 332 is moved by a suitable drive mechanism (not shown) in an appropriate manner as dictated by the shape of part 322. In such embodiments, table 332 may be part of a programmable X-Y table that is vertically adjustable. In still other embodiments, drive mechanisms (not shown) may be provided for moving both printer heads 328, 330 and table 332. For example, table 332 may move in X and Y directions (i.e., orthogonal horizontal directions) and printer heads 328, 330 may move in a Z direction (i.e., a vertical direction).

In most embodiments, system 320 has one or more programmable controllers which control the movement and operation of printer heads 328, 330 and/or table 332 in an appropriate manner to create a desired part. The part is created layer-by-layer from the material shot by printer heads 328, 330. As the part is created, the base material 324 is shot in a pattern so as to create voids, or portions thereof, and the filler material 326 is shot into the voids, or the portions thereof. If desired, system 320 may be used to create parts having voids that are filled with filler material 326, but that are completely encapsulated within base material 324. Thus, if operated in this manner, system 320 may create parts in which no gates or vents are present, but which are still tempered in accordance with this disclosure. In the illustrative example, base material 324 is shot in a pattern so as to create an outer rectangular shell and filler material 326 is shot in a pattern so as to coat or line an inside surface of the outer rectangular shell.

In alternative embodiments, system 320 may have multiple printer heads for shooting one or more types of base material and multiple printer heads for shooting one or more types of filler material to create a desired part. In such alternative embodiments, the various printer heads may be coupled to separate, individual arms or some or all of the various printer heads may be coupled to the same arm. Alternative embodiments of system 320 may also include systems such as the OBJET QUADRA™ 3D Rapid Prototyping Inkjet System and/or the OBJET QUADRA TEMPO™ 3D Rapid Prototyping Inkjet System, both of which are available from Objet Geometries, Inc. having headquarters in Rehovot, Israel and having offices in Mountainside, N.J.

A system 350 which is similar to system 320 and which is operable to fabricate a prototype part 352 such that one or more voids are created in a base material 354 and are filled with a filler material 356 substantially simultaneously is shown diagrammatically in FIG. 15. Components of system 350 which are substantially the same as like components of system 320 are denoted by like reference numerals. Like system 320, system 350 has printer head 328 which shoots the base material from which the associated part is made and which is mounted to an arm 342. However, system 350 has a second arm 362 that is coupled to arm 342 by a pair of support struts 364. A member 366 extends downwardly from arm 362 and has an extrusion head 368 at a lower, distal end thereof. A container or vat 370 of filler material is supported with respect to arm 362 and is coupled to extrusion head 368 by a line 372 that is routed through arm 362 and member 366.

A pump (not shown) or other type of pressure source is provided in system 350, such as in the interior region of arm 362, for forcing filler material 356 from extrusion head 368 in a controlled manner. Thus, in system 350, base material 354 is shot by printer head 328 downwardly toward substrate 332 and filler material 356 is extruded by extrusion head 368 into voids formed in base material 356 as the part 352 is created layer-by-layer. Arms 342, 362 and/or table 332 may be moved by appropriate mechanisms (not shown) of the type described above in connection with the system 320. In alternative embodiments, arm 362 is not coupled to arm 342 and therefore, is movable separately by an associated mechanism.

In most embodiments, system 350 has one or more programmable controllers which control the movement and operation of printer head 328, extrusion head 368, and/or table 332 in an appropriate manner to create a desired part. The part is created layer-by-layer from the material shot by printer head 328 and the material extruded from extrusion head 368. As the part is created, the base material 354 is shot in a pattern so as to create voids, or portions thereof, and the filler material 356 is extruded into the voids, or the portions thereof. If desired, system 350 may be used to create parts having voids that are filled with filler material 356, but that are completely encapsulated within base material 354. Thus, if operated in this manner, system 350 may create parts in which no gates or vents are present, but which are still tempered in accordance with this disclosure. In the illustrative example, base material 354 is shot in a pattern so as to create an outer rectangular shell and filler material 356 is extruded in a pattern so as to coat or line an inside surface of the outer rectangular shell.

In alternative embodiments, system 350 may have multiple printer heads and/or multiple extrusion heads for depositing one or more types of base material and for depositing one or more types of filler material to create a desired part. In such alternative embodiments, the various printer and extrusion heads may be coupled to separate, individual arms or some or all of printer and extrusion heads may be coupled to the same arm. Systems having only extrusion heads are also contemplated by this disclosure, including machines of the type marketed under the trademark STRATYSIS in which ABS and other plastics are extruded, under computer control, in layers on top of each other while still hot so as to melt together to form the part. In addition, systems 320, 350 may have one or more ultraviolet (UV) lights for curing the base material and the filler material from which a prototype part is made.

According to this disclosure, a mold that is intended for a one-time use is made by stereolithography or SLS techniques from a base material and a prototype part is made entirely from a filler material that is introduced into an internal cavity of the base material mold. An example of such a mold 380 having an internal cavity 382 is shown in FIGS. 16-18. In some embodiments of these one-time molds, the mold is fabricated so as to have a relative thin outer wall that surrounds and defines the shape of the final prototype part. In the illustrative example, the part 400 to be made from the filler material using mold 380 has a T-shaped, transverse cross section as shown in FIG. 18. Thus, mold 380 has a set of thin walls that define the shape of part 400. In particular, mold 380 has a horizontal bottom wall 384 that is rectangular in shape, a horizontal top wall 386 that is rectangular in shape, a pair of vertical first side walls 388 extending upwardly from outer edges of wall 384, a pair of vertical second side walls 390 extending downwardly from outer edges of wall 386, a pair of horizontal walls 392 interconnecting respective walls 388, 390, and a pair of vertical end walls 394 at the opposite ends of mold 380. Walls 384, 386, 388, 390, 392, 394 are relatively thin in thickness and provide a shell that surrounds the outer surface of part 400.

One or more gates and vents may be provided in the one-time mold of base material and the filler material may be injected into the internal cavity of the mold after the mold is created from base material. Alternatively, if the one-time mold is made using system 320, system 350, or using similar such systems having printer heads and/or extrusion heads, the filler material may be deposited in the cavity of the one-time mold as the one-time mold is being constructed. In the illustrative example, a set of gates 396 are formed in top wall 386 of mold 380 and a set of vents 398 are formed in bottom wall 384 of mold 380. Thus, cavity 382 of mold 380 is filled with filler material through gates 396 and air escapes from cavity 382 through vents 398 as the filler material enters cavity 382.

After the cavity of the one-time mold is filled with filler material and the filler material sets, the one-time mold may be peeled away from the filler material, much like an egg shell is peeled away from a hard-boiled egg. In the illustrative example, a split line 399 is provided in mold 380 to define two halves of mold 380 that may be separated away from part 400 in directions 410 as shown in FIG. 18. Split line 399 is formed either by constructing mold 280 in two separate halves prior to filling cavity 382 with filler material or by cutting mold 380 with an appropriate tool after cavity 382 is filled with filler material. It will be appreciated the base and filler materials for producing a prototype part using a one-time mold are selected such that cross-linking between the polymers of the base and filler materials is minimized or altogether avoided so that the base material may be more easily peeled away from the filler material.

Companies that design parts oftentimes have their prototype parts made by separate companies that specialize in the fabrication of prototype parts. Thus, according to this disclosure, a process for making a rapid prototype part for a customer comprises receiving a part design from the customer, modifying the part design to have one or more cored-out areas in the part designated for receipt of a filler material, building a portion of the rapid prototype part from a base material by a rapid prototype process, and filling the cored-out areas with a filler material that enhances at least one characteristic of the prototype part. In such a process, analysis of the part design, such as computer analysis, may be conducted to determine high-stress areas of the part design and then these high-stress areas may be modified to have the cored-out areas. The cored-out areas may comprise any of the types of voids disclosed herein, including tunnels with associated gates and vents, and including substantially hollowed-out areas leaving an exterior shell that may or may not have internal support ribs or walls.

After the part design is modified, it is contemplated that the external geometry of the part design provided by the customer will generally remain unaltered. The cored-out areas may be filled with filler material by using any of the following: syringes (with or without needles); pressure guns; pressurized lines; vacuum guns; vacuum lines; or a combination of pressure and vacuum guns or lines. In addition, a prototype part may be oriented during the filling process such that gravity assists in the filling. For example, the part may be oriented so that the filler material moves downwardly through the voids in the part after the filler material is introduced into the voids through associated gates.

Although the invention has been described in detail with reference to certain illustrative embodiments, variations and modifications exist within the scope and spirit of the invention as described and as defined in the following claims.

The invention claimed is:

1. A rapid prototype tempering process comprising
producing a rapid prototype part from a base material;
creating voids in the rapid prototype part, the voids comprising a plurality of separated, elongated tunnels, each tunnel having uniform diameter and extending through the rapid prototype part from one surface of the rapid prototype part to another surface of the rapid prototype part;
filling the voids with a filler material that changes at least one characteristic of the rapid prototype part; and
coating the rapid prototype part with a coating material, after the voids are filled with the filler material, to enhance at least one of the strength and the durability of the rapid prototype part.

2. The process of claim 1, wherein the producing step comprises producing the rapid prototype part by stereolithography.

3. The process of claim 1, wherein the producing step comprises producing the rapid prototype part by selective laser sintering.

4. The process of claim 1, wherein the producing step comprises producing the rapid prototype part by casting.

5. The process of claim 1, wherein the creating step occurs concurrently with the producing step.

6. The process of claim 1, wherein the base material is different than the filler material.

7. A rapid prototype tempering process comprising
producing a rapid prototype part from a base material, the rapid prototype part having voids, the voids comprising a plurality of separated, elongated tunnels, each tunnel having a uniform diameter and extending through the rapid prototype part from one surface of the rapid prototype part to another surface of the rapid prototype; and
filling the voids with a filler material that changes at least one characteristic of the prototype part, wherein the base material and the filler material are the same type of material, but of a different grade.

8. The process of claim 1, wherein the base material comprises one or more of the following types of materials: acrylics, epoxies, nylons, polypropylene, polystyrene, polyethylene, polyethers, urethanes, and polyesters.

9. The process of claim 8, wherein the filler material comprises one or more of the following types of materials: polyesters, polystyrene, styrene, talc, calcium, fiberglass, titanium dioxide, methacrylate monomer, urethanes, adhesives, silicones, peroxide hardener, rubber resins, polyethers, acrylics, nylons, polyethylene, acetels, epoxies, ceramics, MC carbides, styrene monomers, cyandacrylate, acetone, and methyl ethyl ketone.

10. The process of claim 1, wherein the filler material comprises one or more of the following types of materials: polyesters, polystyrene, styrene, talc, calcium, fiberglass, titanium dioxide, methacrylate monomer, urethanes, adhesives, silicones, peroxide hardener, rubber resins, polyethers, acrylics, nylons, polyethylene, acetels, epoxies, ceramics, MC carbides, styrene monomers, cyandacrylate, acetone, and methyl ethyl ketone.

11. A rapid prototype tempering process comprising
producing a rapid prototype part from a base material;
creating voids in the rapid prototype part; and filling the voids with a filler material that changes at least one characteristic of the prototype part, wherein the voids created during the creating step comprise cylindrical tunnels, the tunnels having a uniform cross section and extending through the rapid prototype part from one surface of the rapid prototype part to another surface of the rapid prototype.

12. The process of claim 11, wherein at least one of the cylindrical tunnels have a bend within the rapid prototype part.

13. The process of claim 11, wherein the tunnels extend from a first port on an external surface of the prototype part to a second port on the external surface.

14. The process of claim 1, wherein the filling step comprises substantially completely filling the voids.

15. A rapid prototype tempering process comprising
producing a rapid prototype part from a base material;
creating at least one void in the rapid prototype part, the at least one void comprising a cylindrical tunnel through the rapid prototype part, the cylindrical tunnel having a uniform cross section and extending through the rapid prototype part from one surface of the rapid prototype part to another surface of the rapid prototype; and
filling the at least one void with a filler material that changes at least one characteristic of the prototype part.

16. The process of claim 1, wherein at least one of the producing step and the filling step comprises the use of a printing process.

17. The process of claim 1, wherein at least one of the producing step and the filling step comprises the use of an extruding process.

18. The process of claim 1, wherein the voids created during the creating step comprise cylindrical tunnels.

19. The process of claim 7, wherein at least one of the producing step and the filling step comprises the use of a printing process.

20. The process of claim 7, wherein at least one of the producing step and the filling step comprises the use of an extruding process.

21. The process of claim 7, further comprising coating the rapid prototype part with a coating material to enhance one of the strength and the durability of the rapid prototype part.

22. The process of claim 7, wherein the base material comprises one or more of the following types of materials: acrylics, epoxies, nylons, polypropylene, polystyrene, polyethylene, polyethers, urethanes, and polyesters.

23. The process of claim 7, wherein the filler material comprises one or more of the following types of materials: polyesters, polystyrene, styrene, talc, calcium, fiberglass, titanium dioxide, methacrylate monomer, urethanes, adhesives, silicones, peroxide hardener, rubber resins, polyethers, acrylics, nylons, polyethylene, acetels, epoxies, ceramics, MC carbides, styrene monomers, cyandacrylate, acetone, and methyl ethyl ketone.

24. The process of claim 7, wherein the voids created during the creating step comprise cylindrical tunnels.

25. The process of claim 24, wherein at least one of the cylindrical tunnels have a bend within the rapid prototype part.

26. The process of claim 7, wherein the filling step comprises substantially completely filling the voids.

27. The process of claim 11, wherein the base material is different than the filler material.

28. The process of claim 11, wherein at least one of the producing step and the filling step comprises the use of a printing process.

29. The process of claim 11, wherein at least one of the producing step and the filling step comprises the use of an extruding process.

30. The process of claim 11, wherein the producing step comprises producing the rapid prototype part by stereolithography.

31. The process of claim 11, wherein the producing step comprises producing the rapid prototype part by selective laser sintering.

32. The process of claim 11, wherein the producing step comprises producing the rapid prototype part by casting.

33. The process of claim 11, further comprising coating the rapid prototype part with a coating material, after the voids are filled with the filler material, to enhance one of the strength and the durability of the rapid prototype part.

34. The process of claim 11, wherein the base material comprises one or more of the following types of materials: acrylics, epoxies, nylons, polypropylene, polystyrene, polyethylene, polyethers, urethanes, and polyesters.

35. The process of claim 11, wherein the filler material comprises one or more of the following types of materials: polyesters, polystyrene, styrene, talc, calcium, fiberglass, titanium dioxide, methacrylate monomer, urethanes, adhesives, silicones, peroxide hardener, rubber resins, polyethers, acrylics, nylons, polyethylene, acetels, epoxies, ceramics, MC carbides, styrene monomers, cyandacrylate, acetone, and methyl ethyl ketone.

36. The process of claim 11, wherein additional voids created during the creating step comprise channels.

37. The process of claim 11, wherein the filling step comprises substantially completely filling the voids.

38. The process of claim 15, wherein the cylindrical tunnel has a bend within the rapid prototype part.

39. The process of claim 15, wherein the cylindrical tunnel extends from a first port on an external surface of the prototype part to a second port on the external surface.

40. The process of claim 15, wherein the base material is different than the filler material.

41. The process of claim 15, wherein at least one of the producing step and the filling step comprises the use of a printing process.

42. The process of claim 15, wherein at least one of the producing step and the filling step comprises the use of an extruding process.

43. The process of claim 15, wherein the producing step comprises producing the rapid prototype part by stereolithography.

44. The process of claim 15, wherein the producing step comprises producing the rapid prototype part by selective laser sintering.

45. The process of claim 15, wherein the producing step comprises producing the rapid prototype part by casting.

46. The process of claim 15, further comprising coating the rapid prototype part with a coating material, after the at least one void is filled with the filler material, to enhance one of the strength and the durability of the rapid prototype part.

47. The process of claim 15, wherein the base material comprises one or more of the following types of materials: acrylics, epoxies, nylons, polypropylene, polystyrene, polyethylene, polyethers, urethanes, and polyesters.

48. The process of claim 15, wherein the filler material comprises one or more of the following types of materials: polyesters, polystyrene, styrene, talc, calcium, fiberglass, titanium dioxide, methacrylate monomer, urethanes, adhesives, silicones, peroxide hardener, rubber resins, polyethers, acrylics, nylons, polyethylene, acetels, epoxies, ceramics, MC carbides, styrene monomers, cyandacrylate, acetone, and methyl ethyl ketone.

49. The process of claim 15, wherein additional voids created during the creating step comprise channels.

50. The process of claim 15, wherein the filling step comprises substantially completely filling the voids.

51. The process of claim 15, wherein the creating step occurs concurrently with the producing step.

52. The process of claim 15, wherein the creating step, producing step, and filling step occur substantially simultaneously.

53. A rapid prototype tempering process comprising
producing a rapid prototype part from a base material;
creating voids in the rapid prototype part, the voids comprising a plurality of separated, elongated tunnels, each tunnel having uniform diameter and extending through the rapid prototype part from one surface of the rapid prototype part to another surface of the rapid prototype part;
filling the voids with a filler material substantially simultaneously with the step of creating the voids, the filler material changing at least one characteristic of the rapid prototype part; and
coating the rapid prototype part with a coating material, after the voids are filled with the filler material, to enhance at least one of the strength and the durability of the rapid prototype part.

54. A rapid prototype tempering process comprising
producing a rapid prototype part from a base material, the rapid prototype part having voids, the voids comprising a plurality of separated, elongated tunnels, each tunnel having a uniform diameter and extending through the rapid prototype part from one surface of the rapid prototype part to another surface of the rapid prototype; and
filling the voids with a filler material substantially simultaneously with the step of producing the rapid prototype part having voids, the filler material changing at least one characteristic of the prototype part, wherein the base material and the filler material are the same type of material, but of a different grade.

55. A rapid prototype tempering process comprising producing a rapid prototype part from a base material;

creating voids in the rapid prototype part; and filling the voids with a filler material substantially simultaneously with the step of creating the voids, the filler material changing at least one characteristic of the prototype part, wherein the voids created during the creating step comprise cylindrical tunnels, the tunnels having a uniform cross section and extending through the rapid prototype part from one surface of the rapid prototype part to another surface of the rapid prototype.

56. A rapid prototype tempering process comprising producing a rapid prototype part from a base material;

creating at least one void in the rapid prototype part, the at least one void comprising a cylindrical tunnel through the rapid prototype part, the cylindrical tunnel having a uniform cross section and extending through the rapid prototype part from one surface of the rapid prototype part to another surface of the rapid prototype;

filling the at least one void with a filler material that changes at least one characteristic of the prototype part; and wherein the creating step, producing step and filling step occur substantially simultaneously.

* * * * *